United States Patent
Gidney

(10) Patent No.: US 12,406,201 B2
(45) Date of Patent: Sep. 2, 2025

(54) MAGIC STATE INJECTION INTO SURFACE CODES USING HOOK ERROR MECHANISMS

(71) Applicant: Google LLC, Mountain View, CA (US)

(72) Inventor: Craig Gidney, Goleta, CA (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 18/444,147

(22) Filed: Feb. 16, 2024

(65) Prior Publication Data

US 2025/0005423 A1  Jan. 2, 2025

Related U.S. Application Data

(60) Provisional application No. 63/485,420, filed on Feb. 16, 2023.

(51) Int. Cl.
- *G06N 10/70* (2022.01)
- *G06N 10/20* (2022.01)
- *G06N 10/40* (2022.01)

(52) U.S. Cl.
CPC ............ *G06N 10/70* (2022.01); *G06N 10/20* (2022.01); *G06N 10/40* (2022.01)

(58) Field of Classification Search
CPC ......... G06N 10/70; G06N 10/20; G06N 10/40
USPC .......................... 716/102, 193; 257/31; 326/7
See application file for complete search history.

(56) References Cited

PUBLICATIONS

Magic State Distillation: Not as Costly as You Think Daniel Litinski @ Dahlem Center for Complex Quantum Systems, Freie Universität Berlin, Arnimallee 14, 14195 Berlin, Germany arXiv:1905.06903v3 [quant-ph] Nov. 6, 2019 (Year: 2019).*

Bombin et al., "Logical blocks for fault-tolerant topological quantum computation." PRX Quantum 4.2, Apr. 2023, 020303:1-41.

Bravyi et al., "Universal quantum computation with ideal Clifford gates and noisy ancillas" CoRR, Submitted on Dec. 2004, arXiv:quant-ph/0403025v2, 15 pages.

Brown et al., "Poking Holes and Cutting Corners to Achieve Clifford Gates with the Surface Code" Physical Review X 7.2, Apr. 2017, 021029:1-20.

Chamberland et al., "Universal quantum computing with twist-free and temporally encoded lattice surgery" PRX Quantum 3.1, Feb. 2022, 010331:1-25.

Chamberland et al., "Very low overhead fault-tolerant magic state preparation using redundant ancilla encoding and flag qubits." npj Quantum Information 6.1, Oct. 2020, 12 pages.

(Continued)

*Primary Examiner* — Arnold M Kinkead

(74) *Attorney, Agent, or Firm* — Fish & Richardson P.C.

(57) ABSTRACT

Methods, systems, and apparatus for encoding a magic state in a surface code patch of physical qubits with a target distance. In one aspect, a method includes performing a first surface code cycle on a surface code patch of physical qubits with an initial distance to encode the magic state into the surface code patch. Performing the first surface code cycle introduces a hook error associated with a four-body stabilizer on a qubit included in the surface code patch, where the hook error rotates a logical observable of the surface code patch. Further, performing the first surface code cycle includes initializing the qubit in the magic state. One or more rounds of error detection are performed on the surface code patch that encodes the magic state. The surface code patch is expanded to the target distance based on results of the one or more rounds of error detection.

20 Claims, 18 Drawing Sheets

(56) References Cited

PUBLICATIONS

Fowler et al., "Low overhead quantum computation using lattice surgery" CoRR, Submitted on Sep. 2018, arXiv:1808.06709v3, 15 pages.

Fowler et al., "Surface codes: Towards practical large-scale quantum computation" CoRR, Submitted on Oct. 2012, arXiv:1208.0928v2, 54 pages.

Gavriel et al., "Transversal Injection: A method for direct encoding of ancilla states for non-Clifford gates using stabiliser codes." CoRR, Submitted on Nov. 2022, arXiv:2211.10046v2, 19 pages.

Gidney "Inplace Access to the Surface Code Y Basis" CoRR, Submitted on Apr. 2024, arXiv:2302.07395v2, 25 pages.

Gidney et al., "A fault-tolerant honeycomb memory" CoRR, Submitted on Dec. 2021, arXiv:2108.10457v2, 17 pages.

Gidney et al., "Efficient magic state factories with a catalyzed CCZ to 2T transformation" CoRR, Submitted on Apr. 2019, arXiv:1812.01238v3, 24 pages.

Gidney et al., "How to factor 2048 bit RSA integers in 8 hours using 20 million noisy qubits" CoRR, Submitted on Apr. 2021, arXiv:1905.09749v3, 31 pages.

Häner et al., "Improved quantum circuits for elliptic curve discrete logarithms" CoRR, Submitted on Jan. 2020, arXiv:2001.09580v1, 22 pages.

International Search Report and Written Opinion in International Appln. No. PCT/US2024/015956, mailed on May 31, 2024, 15 pages.

Jones, "Novel constructions for the fault-tolerant Toffoli gate" CoRR, Submitted on Dec. 2012, arXiv:1212.5069v1, 5 pages.

Lee et al., "Even More Efficient Quantum Computations of Chemistry Through Tensor Hypercontraction" CoRR, Submitted on Dec. 2021, arXiv:2011.03494v3, 73 pages.

Li, "A magic state's fidelity can be superior to the operations that created it" CoRR, Submitted on Oct. 2014, arXiv:1410.7808v1, 5 pages.

Litinski, "A Game of Surface Codes: Large-Scale Quantum Computing with Lattice Surgery" CoRR, Submitted on Feb. 2019, arXiv:1808.02892v3, 37 pages.

Litinski, "Magic State Distillation: Not as Costly as You Think" CoRR, Submitted on Nov. 2019, arXiv:1905.06903v3, 22 pages.

Singh et al., "High-fidelity magic-state preparation with biased-noise architecture" Physical Review A 105.5, May 2022, 052410:1-9.

Overleaf.com [online], "Hook Injection" 2023, retrieved on Apr. 23, 2025, retrieved from URL <https://www.overleaf.com/read/ryzsffbktwmb>, 10 pages.

Zenodo.org [online], "Data for "Cleaner magic states with hook injection"" Jan. 2023, retrieved on Apr. 23, 2025, retrieved from URL <https://zenodo.org/records/7575030>, 5 pages.

\* cited by examiner

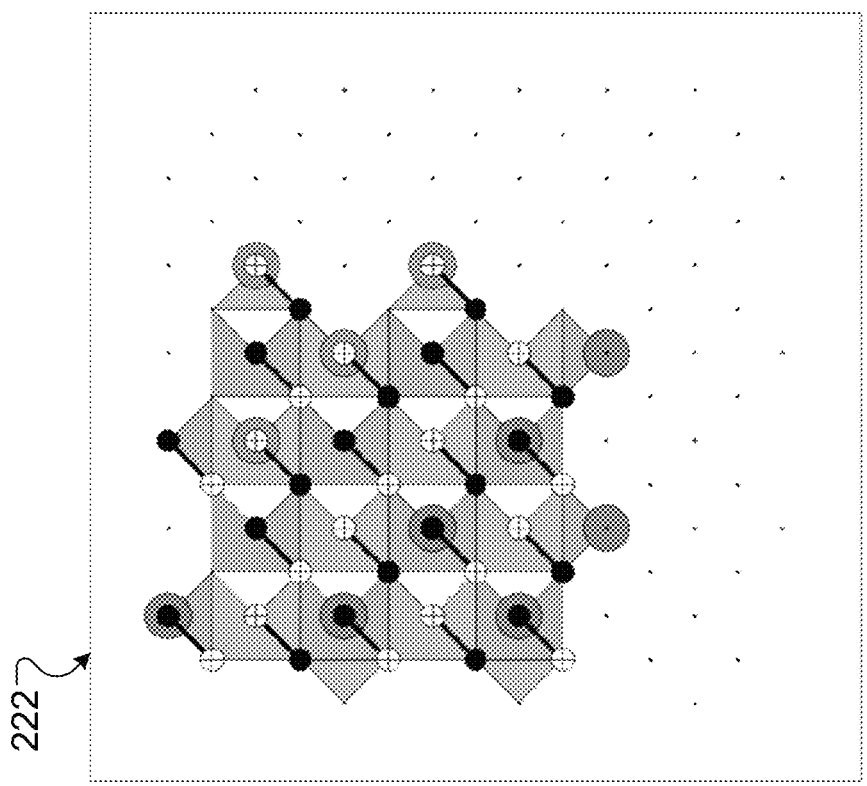
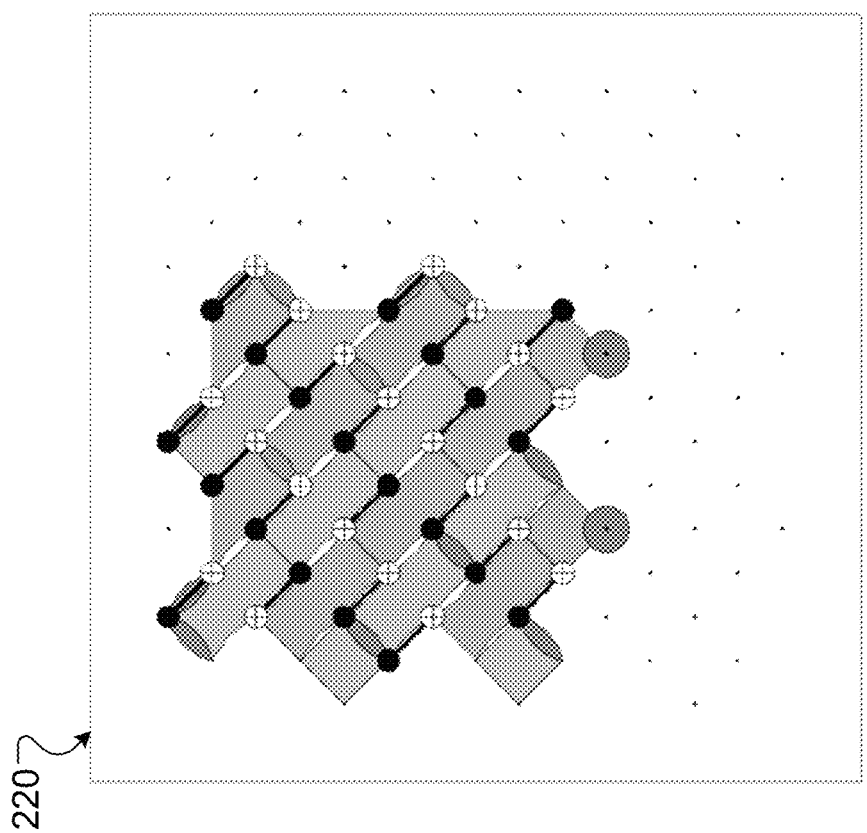
FIG. 2C

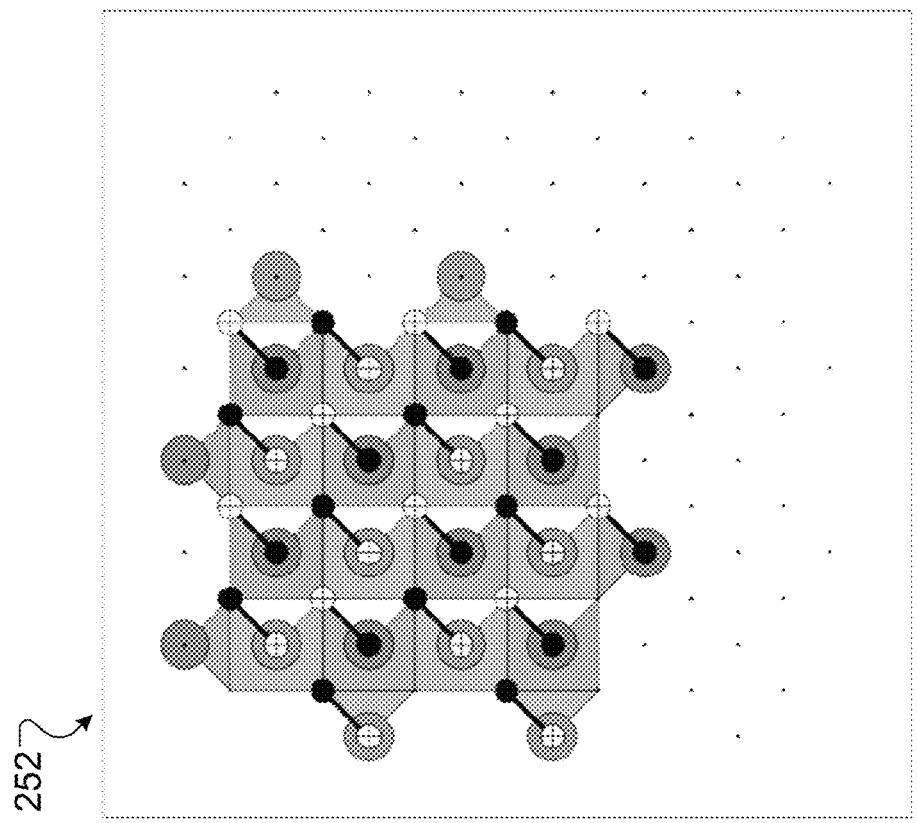
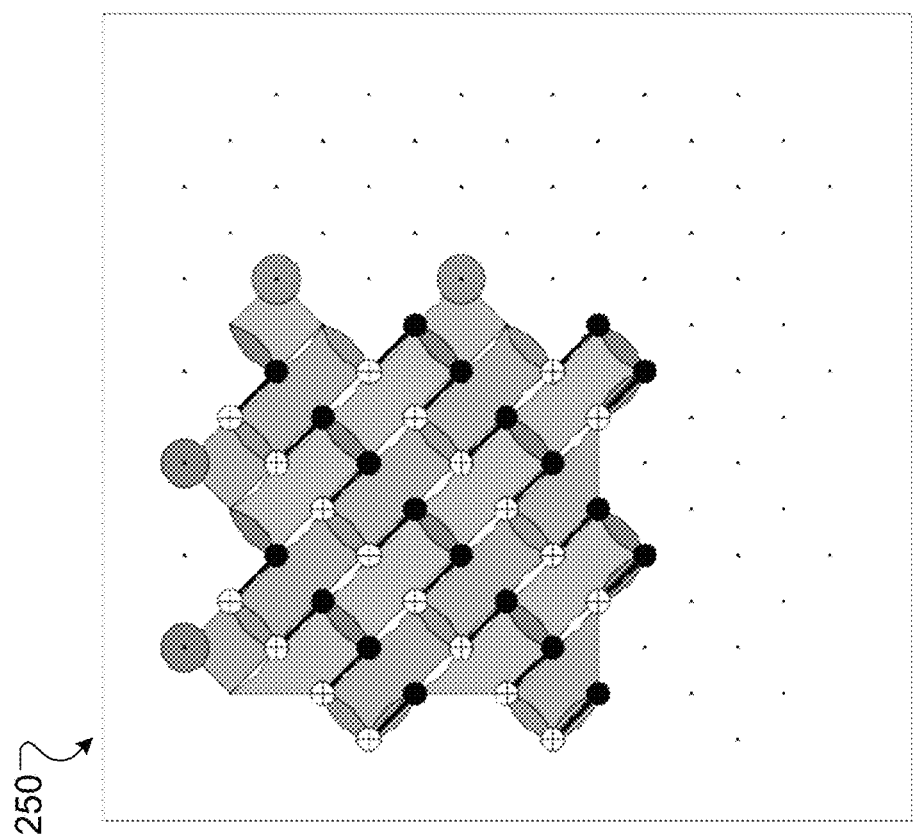
FIG. 2F

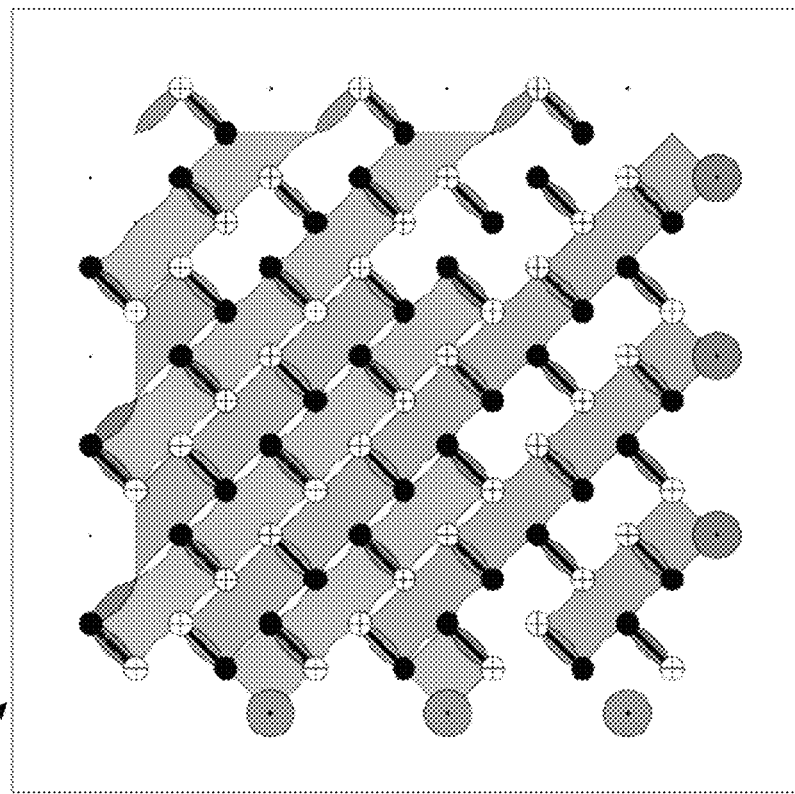
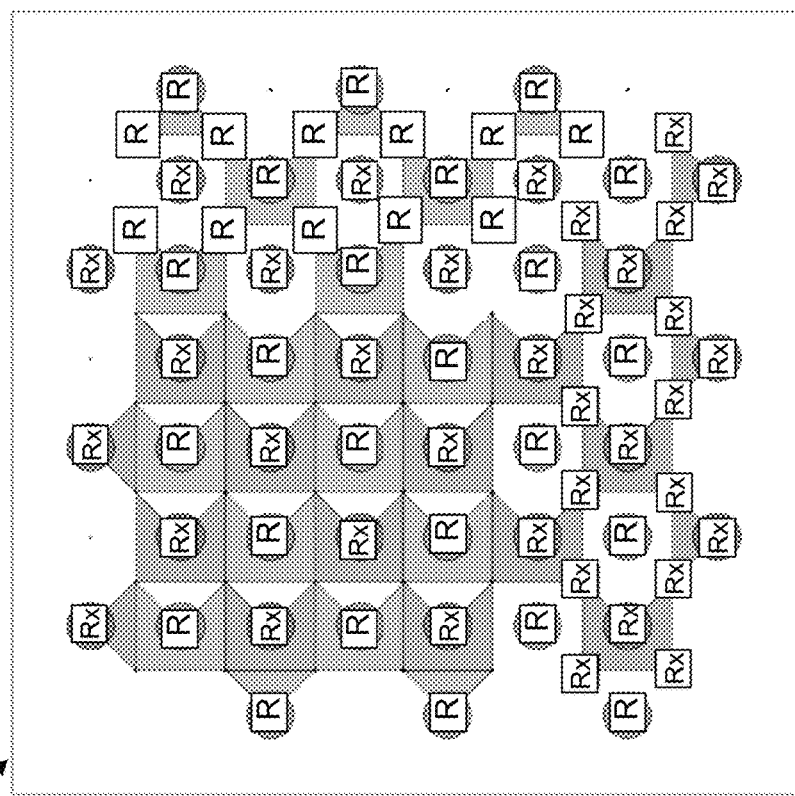
FIG. 2H

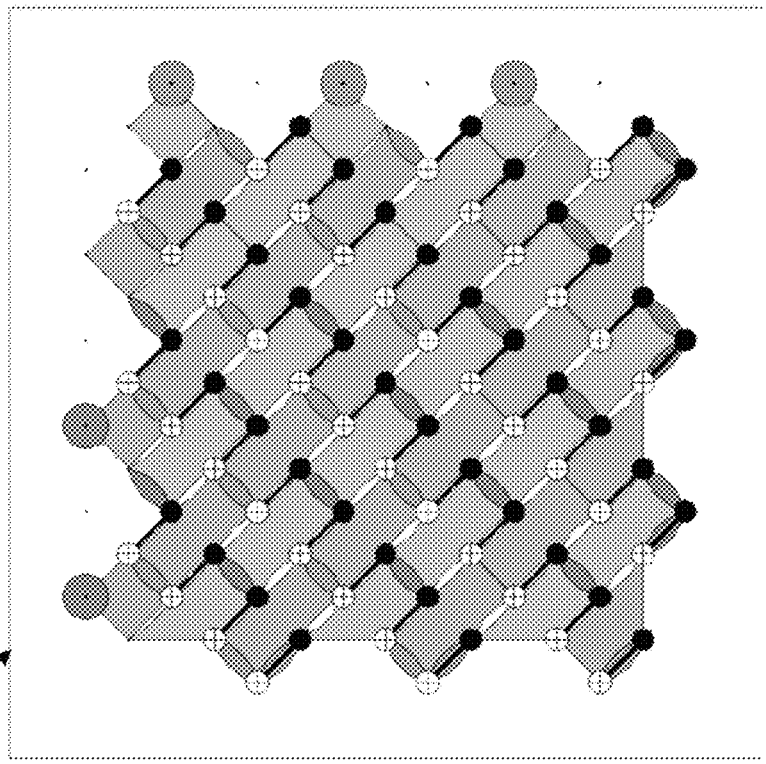
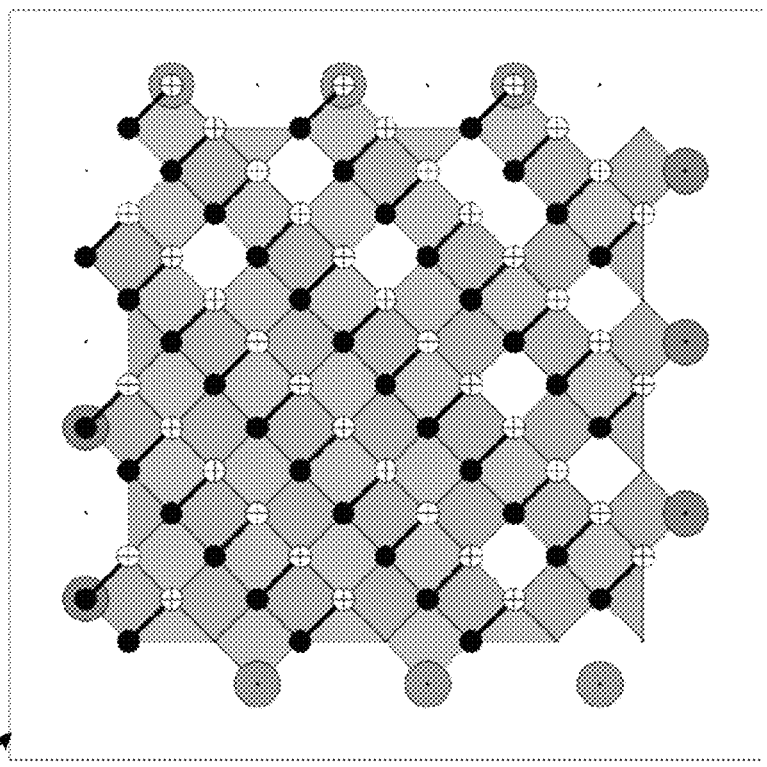
FIG. 21

Observable slice diagrams of the first round of injecting |+⟩
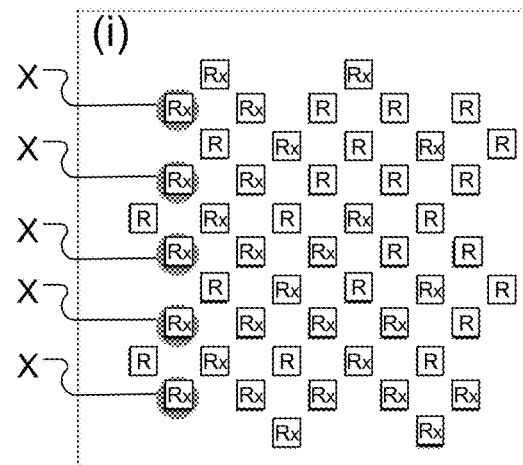
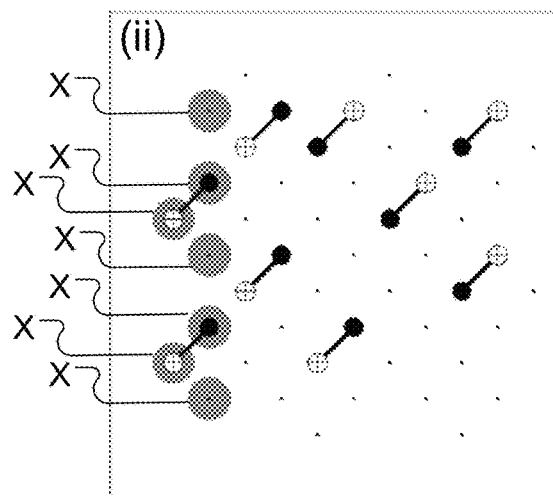
Observable slice diagrams of the first round of injecting |i⟩
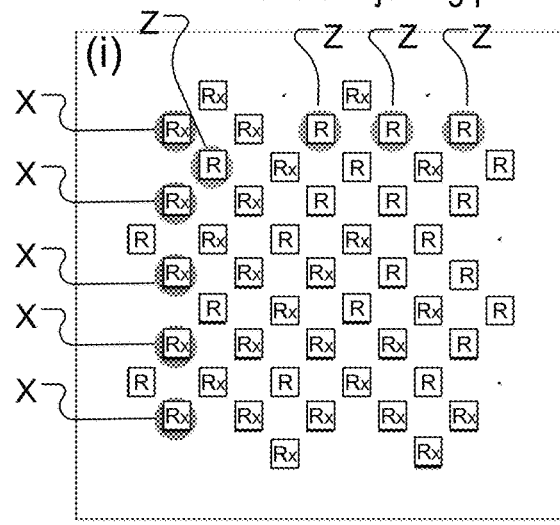
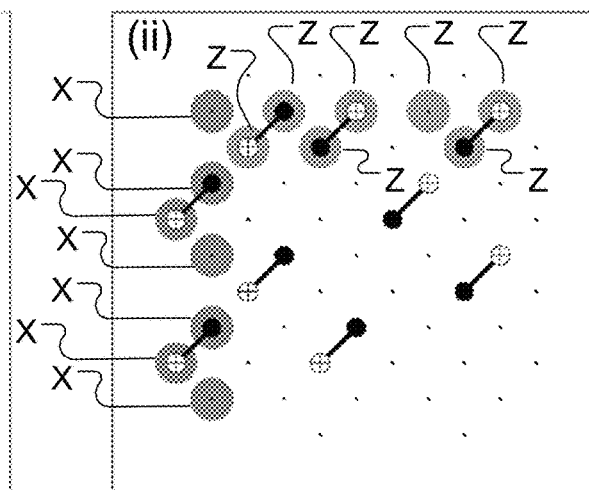
FIG. 3A

MAGIC STATE INJECTION INTO SURFACE CODES USING HOOK ERROR MECHANISMS

CROSS-REFERENCE TO RELATED APPLICATIONS

This application claims the benefit under 35 U.S.C. § 119(e) of U.S. Patent Application No. 63/485,420, entitled "MAGIC STATE INJECTION INTO SURFACE CODES USING HOOK INJECTION," filed Feb. 16, 2023. The disclosure of the foregoing application is incorporated herein by reference in its entirety for all purposes.

BACKGROUND

This specification relates to quantum computing.

Quantum computing provides a means to solve certain problems that cannot be solved in a reasonable period of time using conventional classical computers. These problems include factoring very large numbers into their primes and searching large, unstructured data sets. A number of physical systems are being explored for their use in quantum computing, including ions, spins in semiconductors, and superconducting circuits. However, none of these systems perform sufficiently well to serve directly as computational qubits. For example, single two-state physical systems, which can be used as physical qubits, cannot reliably encode and retain information for long enough to be useful.

Therefore, scalable quantum computers require quantum error correction. Classical error correction employs redundancy. For example, in the repetition code, information is copied and stored multiple times. If the copies are later found to disagree, it can be determined that an error has occurred, and a majority vote can be taken to recover the information. Copying quantum information is not possible due to the no-cloning theorem. Therefore, quantum error correction codes spread the logical information of one qubit onto an entangled state of multiple physical qubits. The multiple physical qubits are collectively referred to as a logical qubit.

Surface codes are a family of quantum error correcting codes that are defined on a two-dimensional grid of qubits. In the surface code, physical qubits are entangled using a sequence of physical qubit CNOT operations, with subsequent measurements of the entangled states providing a means for error correction and error detection. A set of physical qubits entangled in this way is used to define a logical qubit, which due to the entanglement and measurement has far better performance than the underlying physical qubits. One of the significant advantages of surface codes is their relative tolerance to local errors. Surface codes can handle error rates of almost 3% per surface code clock cycle, which is far less stringent than that of other quantum computing approaches. This error tolerance, along with the simple two-dimensional qubit layout, makes a surface code architecture a realistic approach to building a solid-state quantum computer.

SUMMARY

This specification describes techniques for injecting magic states into the surface code using an intentional hook error mechanism.

One innovative aspect of the subject matter described in this specification can be implemented in a method implemented by a quantum computer for preparing a magic state, the method comprising: performing a surface code cycle on a distance 2 surface code patch of physical qubits, wherein performing the surface code cycle introduces a hook error on a four-body stabilizer of the distance 2 surface code patch, and the hook error rotates a logical observable of the distance 2 surface code patch; performing one or more rounds of error detection on the magic state; and expanding the distance 2 surface code patch of physical qubits to a target distance based on results of the one or more rounds of error detection.

Another innovative aspect of the subject matter described in this specification can be implemented in a method implemented by a quantum computer, the method including preparing a distance 2 surface code patch in an array of physical qubits; measuring stabilizers of the distance 2 surface code patch, wherein a four-body stabilizer of the distance 2 surface code patch comprises a hook error that rotates a logical observable of the distance 2 surface code patch; and using the hook error to inject a quantum state into the array of physical qubits.

Other implementations of these aspects include corresponding computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the surface code cycle comprises a rotated surface code cycle.

In some implementations performing the surface code cycle on the distance 2 surface code patch of physical qubits comprises applying a quantum circuit to the distance 2 surface code patch of physical qubits, wherein the quantum circuit is optimized to exclude no-operation entangling gates, the no-operation entangling gates comprising entangling gates with a control qubit in a zero state or entangling gates with a target qubit in a plus state.

In some implementations performing the surface code cycle on the distance 2 surface code patch of physical qubits comprises setting initialization bases of data qubits to the basis across a diagonal line of physical qubits included in the distance 2 surface code patch that crosses a location of the expansion.

The subject matter described in this specification can be implemented in particular ways so as to realize one or more of the following advantages.

Examples of the presently described magic state injection process can improve on known methods in several ways. For example, the presently described techniques can use the rotated surface code instead of the unrotated surface code. This halves the number of physical qubits needed to reach a target code distance. As another example, a different technique can be used to start from a distance 2 surface code patch: rotating the logical observable by introducing an intentional hook error. This can also (or further) reduce the number of distance 1 error mechanisms. It may also simplify the quantum hardware requirements, e.g., by removing the need for the quantum hardware to implement a second type of two-qubit interaction and the need for additional dataqubit-to-data-qubit connectivity at the injection site. As another example, the circuit used during the first round of stabilizer measurements can be optimized to reduce the number of distance 2 error mechanisms.

Further, the magic states prepared using the presently described magic state injection process are cleaner than magic states generated using conventional techniques, i.e., techniques that are different to those described herein. The hook error mechanism can be used as a control knob for injecting magic states into surface codes. A benefit of this approach is that states can be injected in the XY or YZ plane of the Bloch sphere. This increases fidelity because perturbations out of the target plane can be detected as errors. The technique is shown to outperform previous injection techniques, achieving lower error rates at smaller spacetime cost under digitized circuit noise.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2J shows an example hook injection quantum circuit.

FIGS. 3A-D show observable slice diagrams that correspond to a first round of stabilizer measurements in a hook injection quantum circuit.

Like reference numbers and designations in the various drawings indicate like elements.

DESCRIPTION

Figure 1:
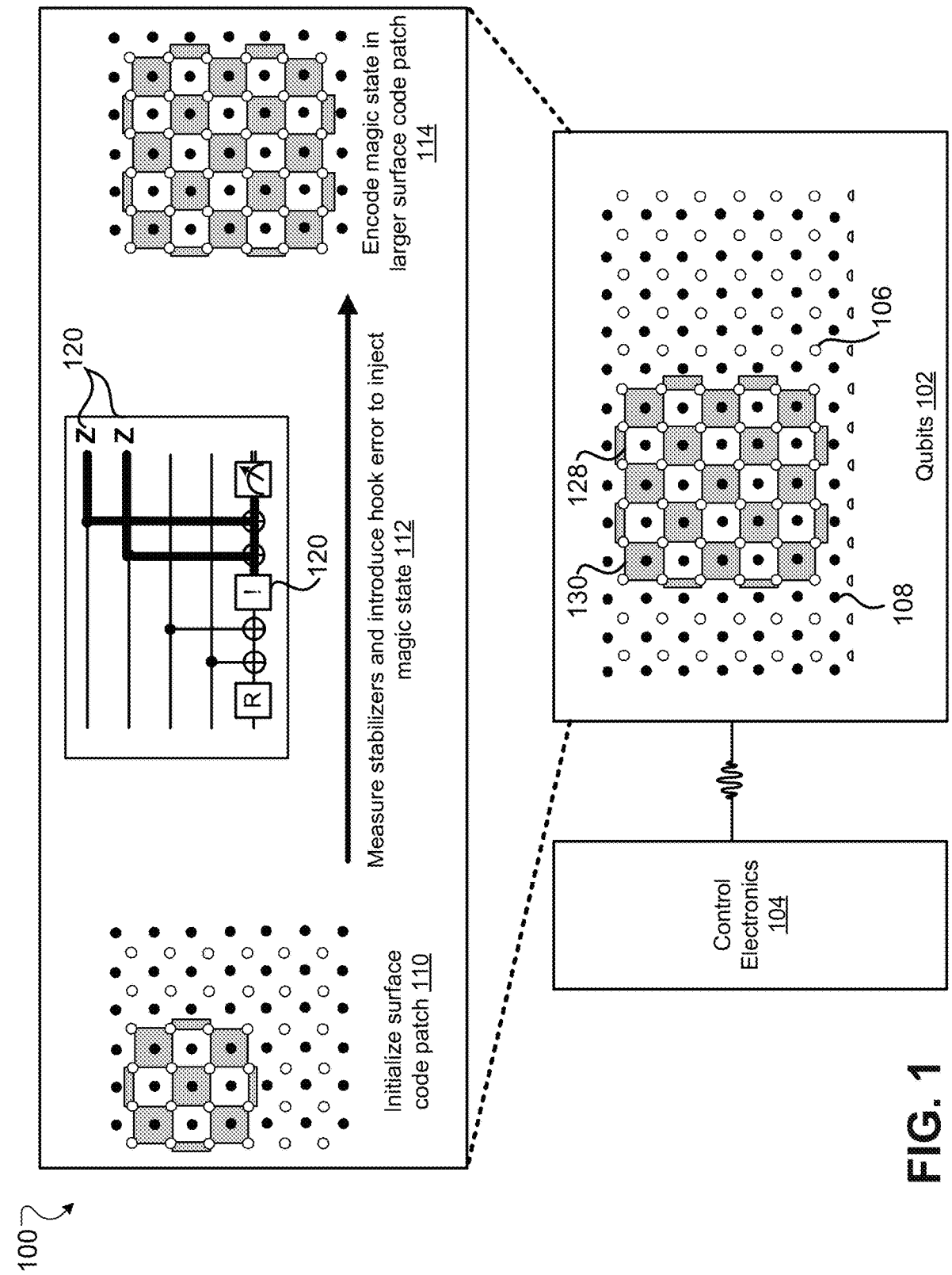
FIG. 1 is a block diagram of an example system for magic state injection into surface codes using hook error mechanisms.

The present disclosure describes techniques for encoding magic states into a surface code using an intentional hook error mechanism. A first surface code cycle is performed on a surface code patch with an initial distance to encode the magic state into the surface code patch, where the first surface code cycle purposefully introduces a hook error associated with a four-body stabilizer on a qubit included in the surface code patch and the qubit is initialized in the magic state. After the initial encoding of the magic state into the surface code is verified using one or more rounds of error detection, the surface code patch is expanded to the target distance.

The surface code is a leading candidate for use in large scale fault tolerant quantum computers, e.g., due to its high threshold and low connectivity requirements. Although the surface code is lenient on quality, it is demanding on quantity. The spacetime cost of non-Clifford operations, e.g., T gates and Toffoli gates, is particularly large. An efficient known technique for performing these gates is magic state distillation, which is expected to cost millions or tens of millions of qubit rounds per non-Clifford gate.

Magic state distillation is a resource intensive subroutine that consumes noisy input states to produce a smaller number of high-fidelity resource states that are used to perform logical operations, e.g., non-Clifford gates. The magic state distillation process starts with magic state injection, where noisy physical magic states are encoded into a surface code to be distilled. The injection error rate (the error rate of the initial magic states before distillation) is a key factor in the cost of magic state distillation and can determine important properties of the distillation process, e.g., how many levels of distillation are required. For example, when using a $15T \xrightarrow{35p^3} T$ factory, improving the error rate of injected states from 0.1% to 0.01% allows some classically intractable algorithms to be performed with one level of distillation instead of two.

Reducing the number of levels of distillation would have a large impact on the overall cost of non-Clifford gates. For example, reducing the number of levels of distillation from two to one reduces the number of T state injections per logical T gate from 225 to 15, and per Toffoli gate from 900 to 60. Even accounting for varying code distances within the factories distilling these injected states, this would cut the spacetime cost of non-Clifford gates by a factor of 3. More generally, having a better injection error rate creates slack throughout the distillation process. This slack can then be used to reduce costs in a variety of ways. For example, an injection error rate that is not low enough to omit the second $15T \xrightarrow{35p^3} T$ factory may still be good enough to replace that factory with an $8T \xrightarrow{28p^2} CCZ$ factory, reducing the number of T state injections per logical Toffoli gate from 900 to 120. Alternatively, the code distance used during the first level of distillation could be reduced.

Some magic state injection methods include injecting magic states by treating a physical qubit as a degenerate 1×1 surface code, expanding that surface code to an intermediate distance $d_{inject}$, maintaining the intermediate distance for a small number of rounds $r_{inject}$, and then expanding to the target distance. If any detection events occur before the final expansion, the whole process is restarted. Restarting in this manner decreases the error rate, and using a smaller patch during verification allows multiple attempts to be run in parallel.

Another known magic state injection method also uses an approach where verification is performed at a smaller size but improves the injection error rate by starting with a surface code patch that is already at distance 2. The logical observable of this patch is rotated using a ZZ(θ) operation between two of the data qubits. This cuts down on the number of distance 1 error mechanisms present in the circuit.

The presently described magic state injection method improves on the above described known methods in several ways. For example, the presently described techniques use the rotated surface code instead of the unrotated surface code. This halves the number of physical qubits needed to reach a target code distance. As another example, a different technique is used to start from a distance 2 surface code patch: rotating the logical observable by introducing an intentional hook error. This further reduces the number of distance 1 error mechanisms. It also removes the need for the quantum hardware to implement a second type of two-qubit interaction, and the need for additional data-qubit-to-data-qubit connectivity at the injection site. As another example, the circuit used during the first round of stabilizer measurements can be adjusted to reduce the number of distance 2 error mechanisms.

FIG. 1 is a block diagram of an example system for magic state injection into surface codes using hook error mechanisms. The example system 100 is an example of a system implemented as part of a classical and quantum computing device in which the systems, components and techniques described in this specification can be implemented.

The system 100 includes multiple qubits 102 in communication with control electronics 104. The qubits 102 are physical qubits, e.g., physical devices that behave as a two-state quantum system. Each qubit can be in a respective quantum state that occupies one or more levels. The levels include two computational levels, e.g., levels 0- and 1-, and one or more non-computational levels that are each higher than the computational qubit levels, e.g., levels 2- and 3-. Population of the higher, non-computational qubit levels can introduce errors in algorithmic operations or quantum computations performed using the qubit. For example, the occupation of qubit levels outside the computational subspace can hamper or prevent the implementation of quantum error correction operations.

In some implementations the qubits 102 can be superconducting qubits or semiconducting qubits. For example, the qubits 102 can include Xmon qubits, flux qubits, phase qubits, or qubits with frequency interactions. Generally, the qubits 102 are physical devices that are configured to meet basic requirements for quantum computation. For example, the qubits 102 include physical devices that can be initialized, can perform single-qubit rotations, can participate in two-qubit entangling operations, e.g., CZ and CNOT, gates, can perform a topological version of the Hadamard transformation, e.g., by exchanging their quantum states in a SWAP operation, and can be measured.

The qubits 102 are arranged in an array. For example, as shown in FIG. 1, in some implementations the qubits 102 can be arranged as a two dimensional square grid. In some implementations the system 100 may include a smaller or a larger number of qubits than that shown in FIG. 1.

The qubits 102 can interact with each other through multiple qubit couplers. The qubit couplers can define nearest neighbor interactions between qubits, e.g., such that in a square grid each qubit interacts with at most four neighboring qubits or in a hex grid each qubit interacts with at most three neighboring qubits. The couplers can, in principle, be any type of coupler, e.g., a capacitive or inductive coupler. In some implementations the strengths of the couplers can be controllable, e.g., frequency controllable. In other implementations the couplers can be couplers with a fixed coupling strength.

The control electronics 104 include control devices, e.g., arbitrary waveform generators, that can operate the multiple qubits 102. For example, the control electronics 104 can include control devices that tune operating frequencies of the qubits 102 by applying control signals, e.g., voltage pulses, to the qubits through respective control lines.

As another example, the control electronics 104 can control individual frequencies of the qubits 102 such that the frequency of one or more of the qubits are adjusted towards or away from a frequency of an excitation pulse generated by an excitation pulse generator on an excitation driveline. The excitation pulses can include pulses with frequencies that implement quantum operations, e.g., quantum logic gates. The qubits 102 can be coupled to an excitation driveline via respective couplers. In some cases, the couplers can be capacitive couplers, e.g., realized by a microwave line running adjacent to a qubit capacitor.

The control electronics 104 can also include control devices that tune frequencies of the couplers that couple the multiple qubits 102.

The type of control electronics 104 that the system 100 utilizes is dependent on the type of qubits the system uses. As an example, qubits that are realized via atomic, molecular or solid-state quantum systems typically have energy separation of the relevant qubit levels in the microwave or optical domain. The states of such qubits may be manipulated and controlled using external fields, such as microwave or optical fields. In such cases, as an example, mode-locked lasers may serve as control electronics due to their broadband optical spectra that feature both radio frequency and microwave structure. In another example, the control electronics 104 could include a collection of individual qubit controllers realized by a radio frequency generator as well as one or a collection of global excitation controllers realized by a radio frequency or microwave generator. In both cases, the control electronics 104 can be operated manually or connected to a computer and controlled via suitable software allowing for specifying and automatically running the required qubit operations.

The control electronics 104 can be programmed to perform surface code quantum computations. To implement the surface code, each qubit in the multiple qubits 102 has one of two functional types: data qubits, e.g., qubit 106, and measure qubits, e.g., qubit 108. A data qubit, e.g., qubit 106, is a qubit that participates in quantum computations performed by the system 100 and stores quantum information corresponding to the quantum computations. That is, the state of the data qubit encodes logical information for a quantum computation. A measure qubit is a qubit that is used to determine an outcome of a computation performed by the data qubit. For example, during a computation an unknown state of the data qubit can be entangled with the state of the measure qubit using a suitable physical operation, after which the measure qubit can be measured. The measure qubits can include measure-X qubits, e.g., measure qubits located in centers of white squares such as square 128, and measure-Z qubits, e.g., measure qubits located in centers of grey squares such as square 130.

Each data qubit is directly coupled to multiple measure qubits (and is not directly coupled to any other data qubits) and each measure qubit is directly coupled to multiple data qubits (and is not directly coupled to any other measure qubits). For example, in a four coupler surface code each measurement qubit is coupled to four data qubits (if the measure qubit is in the bulk, if it is at the boundary it is coupled to less data qubits). Each data qubit is coupled to two measure-Z qubits and to two measure-X qubits (if the data qubit is in the bulk, if the data qubit is at the boundary it is coupled to less measure qubits). In the four coupler surface code, a measure-Z qubit is a qubit that can be used to force its neighboring data qubits a, b, c and d into an eigenstate of the operator product $\hat{Z}_a\hat{Z}_b\hat{Z}_c\hat{Z}_d$ where $\hat{Z}_a$ represents a Pauli-Z operator acting on qubit a. Each measure-Z qubit is therefore described as measuring a ZZZZ stabilizer. In the example array 102 of FIG. 1, ZZZZ stabilizers are represented by the grey squares, where data qubits exist at the vertices of the ZZZZ stabilizers and measure-Z qubits exist at the center of each ZZZZ stabilizer. A measure-X qubit is a qubit that can be used to force its neighboring data qubits a, b, c and d into an eigenstate of the operator product $\hat{X}_a\hat{X}_b\hat{X}_c\hat{X}_d$ where $\hat{X}_a$ represents a Pauli-X operator acting on qubit a. Each measure-X qubit is therefore referred to as measuring a XXXX stabilizer. In the example array 102 of FIG. 1, XXXX stabilizers are represented by the white squares, where data qubits exist at the vertices of the XXXX stabilizers and measure-X qubits exist at the center of each XXXX stabilizer.

As another example, in a three coupler surface code each measurement qubit is coupled to three data qubits (if the measure qubit is in the bulk, if it is at the boundary it is coupled to less data qubits). Each data qubit is coupled to three measure qubits (if the data qubit is in the bulk, if the data qubit is at the boundary it is coupled to less measure qubits).

A collection of measure qubits and data qubits is referred to as surface code patch and forms a logical qubit. A logical qubit has a code distance d which is defined as the minimum number of physical operators (e.g., qubit bit-flips or phase-flips) needed to define an X or Z logical operator for the logical qubit.

The control electronics 104 can operate a surface code patch by repeatedly applying a quantum circuit to the measure qubits and data qubits included in the patch. Each application of the quantum circuit performs one surface code cycle. Each quantum circuit includes a sequence of operations. For example, in a four coupler surface code construction, first, each measure qubit is reset, e.g., in a ground state. Then, four layers of entangling operations, e.g., CNOT gates or CZ gates, are performed. For measure-Z qubits, each of the four layers of entangling operations targets the measure qubits and nearest-neighbor data qubits act as controls for respective entangling operations. For measure-X qubits, each of the four layers of entangling operations targets nearest-neighbor data qubits and the measure-X qubits act as controls for each of the four entangling operations. In this case, the sequence of operations also includes a layer of Hadamard gates applied to the measure qubits before and after the entangling operations. After the entangling operations are performed, the measure qubits are measured, e.g., through projective measurement, to obtain classical measurement outcome bits. Following the measurement of the measure qubits, a subsequent surface code cycle is performed.

Errors that occur on measure qubit or data qubits cause detection events in the measurement outcome bits. A detector is a parity of measurement outcome bits that is deterministic in the absence of errors. The outcome of a detector measurement is 1 if the observed parity differs from the expected parity for a noiseless computation and is 0 otherwise. A Pauli-type error P is said to flip a detector D if including P in the circuit changes the outcome of D, and a detection event is a detector with outcome 1.

One example type of error that can occur on a measure qubit are hook errors. A hook error is a single physical error that occurs on a measure qubit halfway through the surface code cycle and causes a set of detection events that is equivalent to two data errors at the end of the cycle. Typically, when compiling the surface code into a circuit, it is important to pick an order of operations (e.g., an order in which the entangling operations touch the data qubits) that avoids aligning these two data errors in a direction that would help logical errors cross the patch. For example, a Z error 120 on a measure qubit halfway through the cycle can spread into two data errors 122 by the end of the surface code cycle. If these two data errors 122 are oriented between Z boundaries, this is a problem because an undetectable logical error can be made using half as many physical errors as anticipated.

In conventional implementations of the surface code and magic state injection, hook errors are considered a problem. However, they are also an opportunity—during the surface code cycle, a hook error associated with a four body stabilizer can only occur at one specific time on one specific qubit and in one specific basis. The present disclosure takes advantage of this high specificity and uses hook errors as control knobs for magic state injection.

An example method for magic state injection is as follows. A first surface code patch is initialized. The first surface code patch can be a distance 2 surface code patch. The stabilizers of the first surface code patch are measured through application of the above described quantum circuit 112. However, the order of the operations performed during measurement of the stabilizers are specifically selected to induce a hook error on the patch's four body stabilizer.

The specific order used to induce a hook error depends on the type of boundaries at the surface code patch and the location at which the magic state is to be injected, referred to herein as the injection site. The specific order can be determined in advance, e.g., prior to execution of the surface code cycle. For example, the system can identify the boundary types of the surface code patch, e.g., identify Z type boundaries that measure respective Z stabilizers. The system can then identify two data qubits that will interact with the qubit at the injection site during the surface code cycle and could propagate a Z error from one Z type boundary to the other Z type boundary. Since a hook error occurs halfway through a surface code cycle, the system can then determine an order of operations that interacts with one of the identified data qubits in the first layer of entangling gates and interacts with the other of the identified data qubits in the second layer of entangling gates ("before" the hook error occurs halfway through the cycle). Alternatively, the system can determine an order of operations that interacts with the identified qubits in the third layer and fourth layer of entangling gates, i.e., "after" the hook error. See, e.g., the example order of operations described below with reference to FIGS. 2A and 2B. The hook error directly rotates the patch's logical observable and is used as a control knob to inject a magic state (i.e., initialize a magic state on a data qubit in the patch). Example magic states include stabilizer states $|i\rangle$ and $|+\rangle$ or T-type and H-type magic states. Because the hook error is specific to one basis, this control knob rotates around one axis of the Bloch sphere. This limits the set of injected states to the XY plane of the Bloch sphere (or the YZ plane, depending on the basis of the four body stabilizer) but allows perturbations of the rotation axis to be detected as errors.

The surface code patch is then grown to an intermediate distance (preferably as quickly as possible or as quickly as practical). By careful ordering of operations, this can happen as the hook error is induced, while still measuring all stabilizers and without using additional layers of two qubit operations. By the end of the first round of stabilizer measurements, the distance 2 surface patch has already grown to the intermediate distance. The intermediate distance can then be maintained for a number of surface code cycles, before the surface code patch is expanded to the target distance and the magic state has been encoded in the larger surface code patch 114. If any detection events occur before the final expansion, the process is restarted.

In some implementations, to minimize the parts of the patch that are at low code distance, the initialization basis of data qubits can switch from X to Z across the patch's diagonal that crosses the injection site. In addition, in some implementations, entangling operations (e.g., CNOT operations) that would be no-operations (due to having a control qubit in the $|0\rangle$ state or a target qubit in the $|+\rangle$ state) are removed from the circuit. This saves half the entangling operations in the first layer of two qubit gates, reducing noise. An example circuit resulting from these choices is referred to herein as a hook injection quantum circuit and is shown in FIGS. 2A-2J.

In examples provided by the present disclosure, the surface code is implemented using the rotated surface code. The rotated surface code is a variant of the surface code defined on a square lattice that has been rotated 45 degrees such that qubits are on vertices, and both X and Z-type stabilizers occupy plaquettes in an alternating checkerboard pattern.

FIGS. 2A-2J show detector slice diagrams of an example hook injection quantum circuit. In this example, hook injection is performed with $d_{inject}=5$, $r_{inject}=2$, and target distance $d=7$ (where the parameters $d_{inject}$, $r_{inject}$, and d are described above). The layers of the hook injection quantum circuit (the detector slice diagrams) advance in reading order, from left to right then from FIG. 2A to 2J. Each diagram illustrates the states of the stabilizers after the respective operations included in the diagram have been applied. In each diagram, the stabilizers are represented by the different contracting and expanding shapes (which is standard notation in the field of quantum error correction).

Figure 2A:
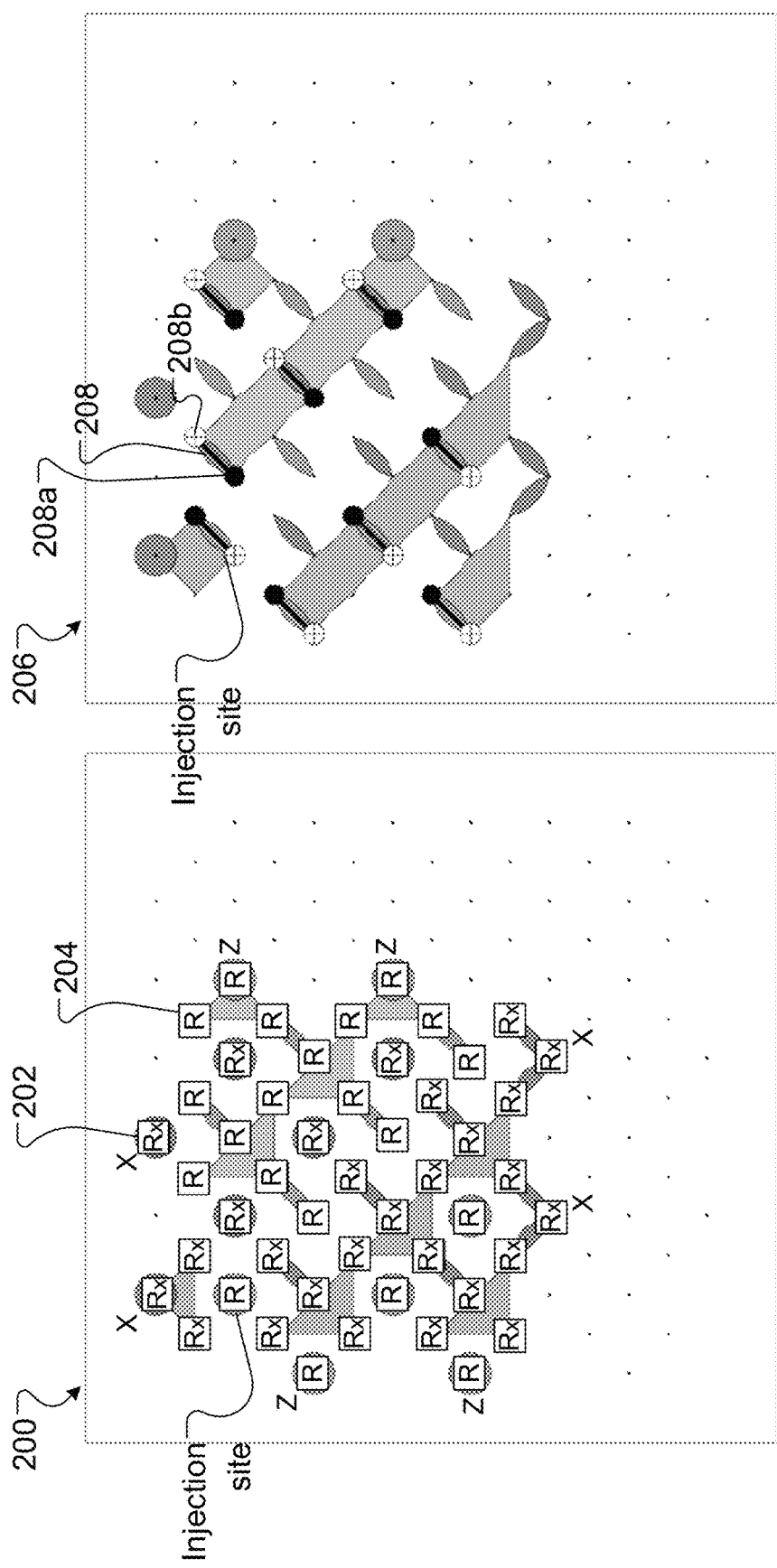

FIG. 2A includes a first diagram 200 that shows a first layer of operations applied to a surface code patch of measure and data qubits. In this example, the surface code patch measures Z operators along the left and right boundaries of the patch and measures Z operators along the top and bottom boundaries of the patch (as indicated by the "Z" and "X" labels). The qubit at which the magic state will be injected is labelled as the "injection site". The injection site and its neighboring qubits form the distance 2 surface code patch from which the hook injection circuit starts (as opposed to starting from a degenerate 1×1 surface code). Data qubits in a lower left triangle of the patch (where the diagonal of the triangle includes the diagonal that crosses the injection site) are initialized in the X basis and data qubits in an upper right triangle of the patch (where the diagonal of the triangle does not include the diagonal that crosses the injection site and is above the diagonal that crosses the injection site) are initialized in the Z basis. Data qubits that neighbor the injection site are initialized in the X basis. The first layer of operations includes a set of reset operations 202, 204 that initialize respective qubits in the surface code patch, e.g., initialize the qubits in zero states.

FIG. 2A also includes a second diagram 206 that shows a second layer of operations applied to the surface code patch. The second layer of operations includes a first set of entangling operations, e.g., CNOT gates such as CNOT gate 208. Each CNOT gate uses a respective measure qubit as a control (represented by a solid circle) and targets a neighboring data qubit (represented by the white circle). For example, CNOT gate 208 is applied between measure qubit 208a and neighboring data qubit 208b. At the injection site, a CNOT gate is applied between the qubit at the injection site and a neighboring data qubit that is above and to the right of the injection site. This layer of entangling operations omits half of the CNOT gates that would normally present in a standard surface code cycle (i.e., omits CNOT gates that would be no-operations), since they would have no effect on the initial state but could introduce additional error.

Figure 2B:
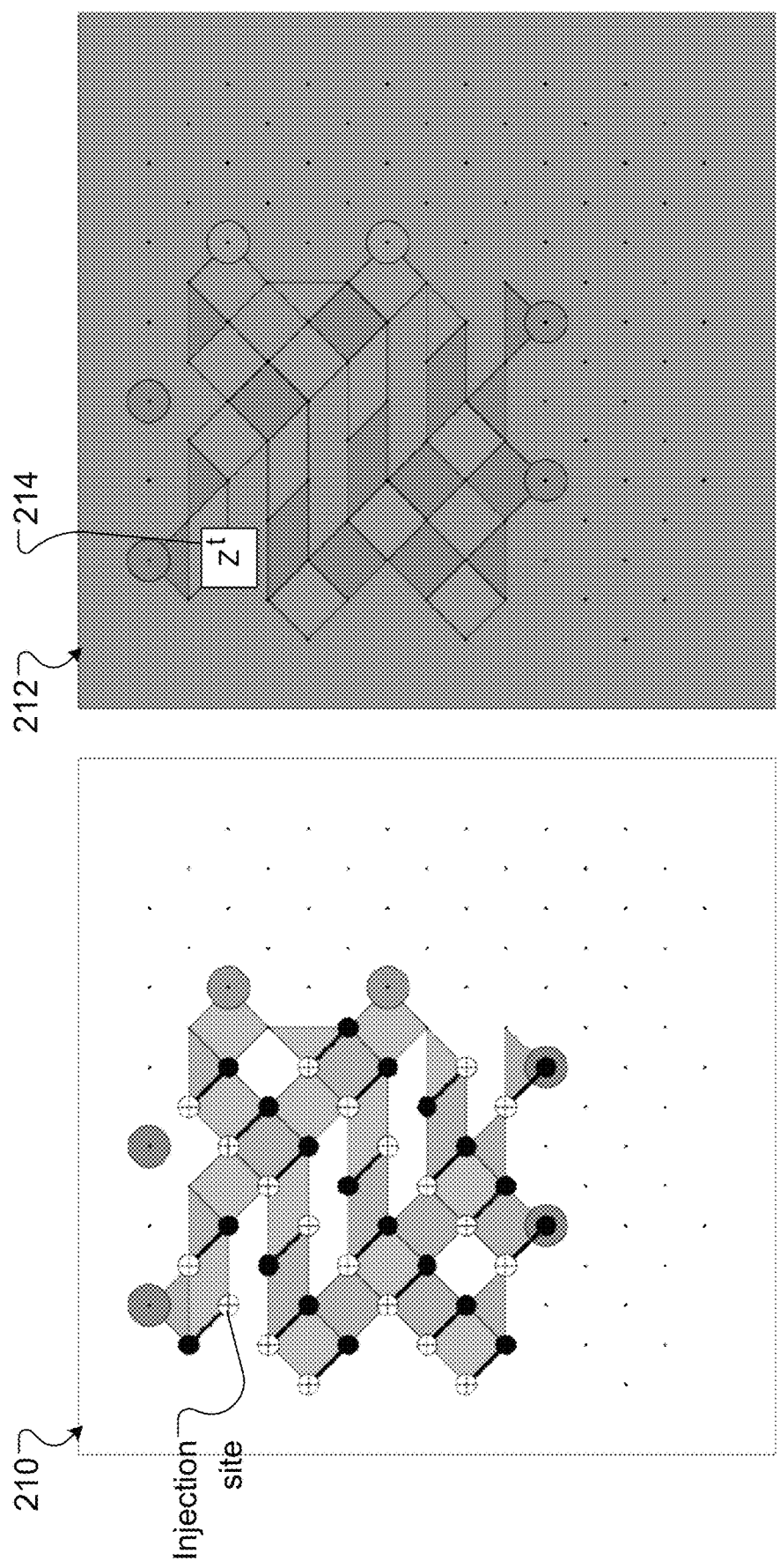

FIG. 2B includes a first diagram 210 that shows a third layer of operations applied to the surface code patch. The third layer of operations includes a second set of entangling operations, e.g., CNOT gates. Each CNOT gate uses a respective measure qubit as a control and targets a different neighboring data qubit. At the injection site, a CNOT gate is applied between the qubit at the injection site and a neighboring data qubit that is above and to the left of the injection site (whereas other CNOT gates are applied between measure qubits and respective data qubits that are located below and to the right of the measure qubit). The order of the CNOT gates at the injection site in the first and second set of entangling operations causes respective Z errors to be oriented between the Z boundaries of the patch. In this example, CNOT gates on the diagonal that crosses the injection site also follow the same order/direction as the CNOT gate at the injection site. This is to optimize the circuit, since if the CNOT gates on this diagonal followed the same direction as the other CNOT gates that are not located on the diagonal. At least one data qubit would not be interacted with, and the surface code cycle would need to include another layer of operations to interact with this data qubit and obtain a full set of measurement data.

Figure 3B:
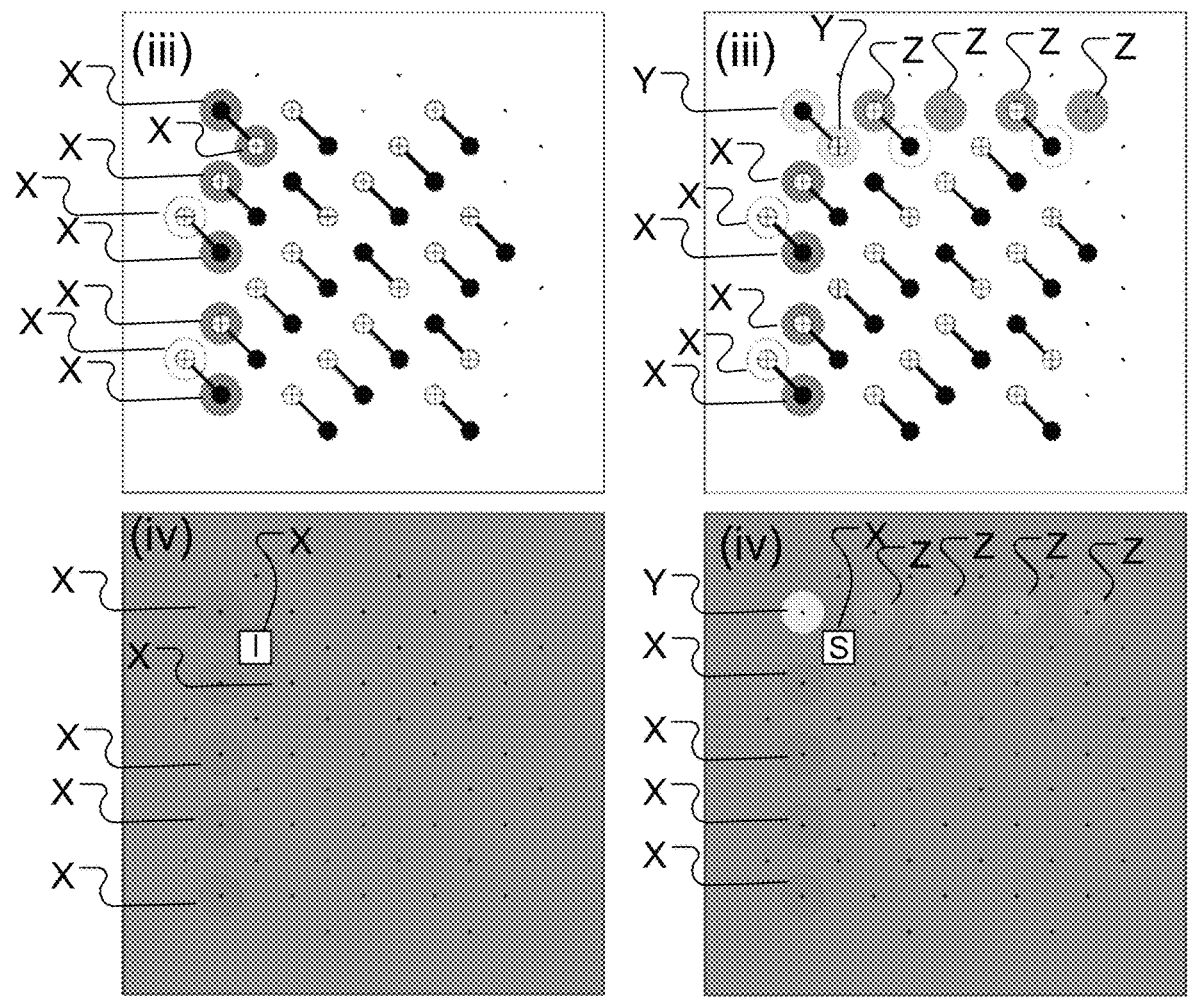
Figure 3C:
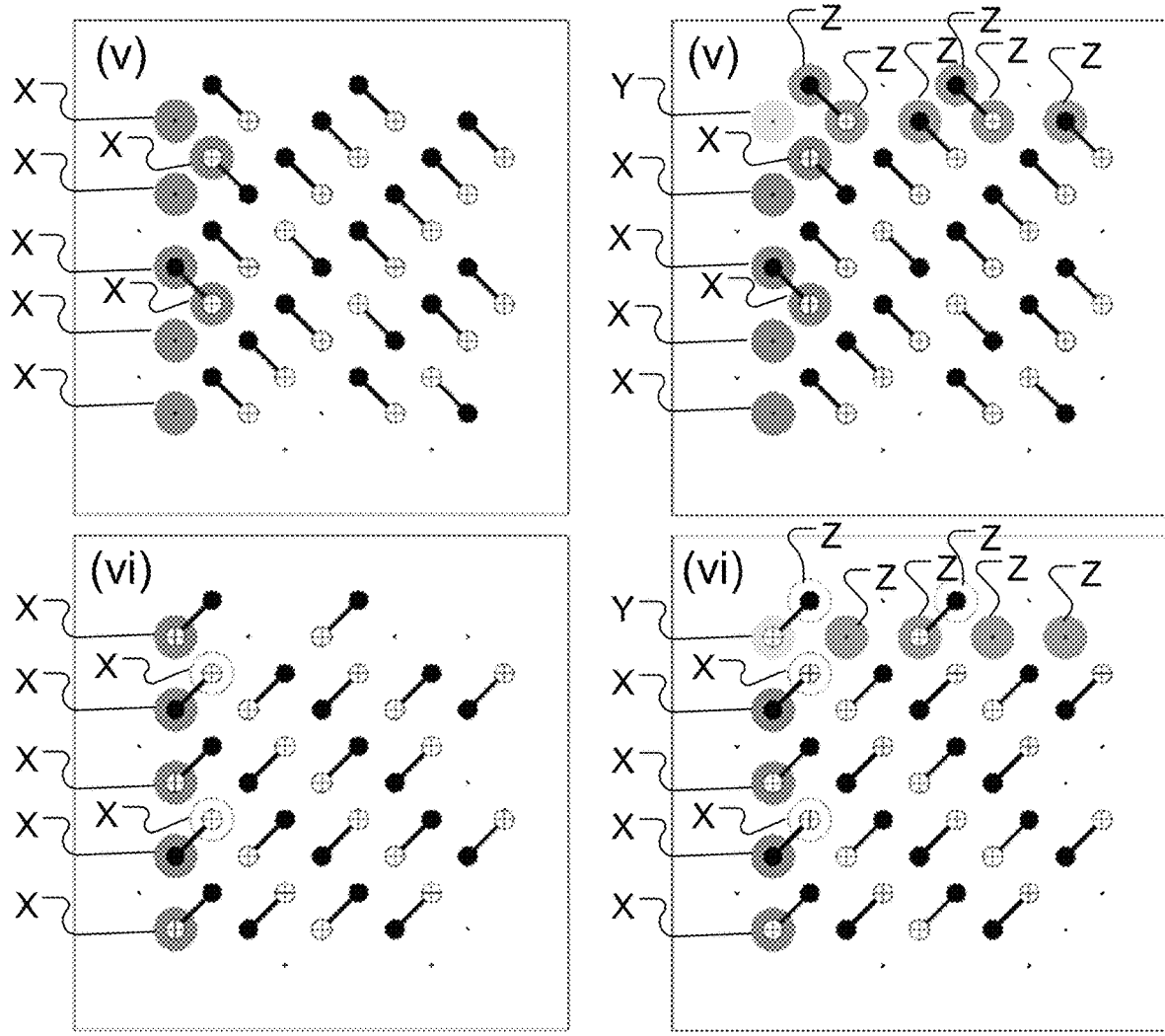
Figure 3D:
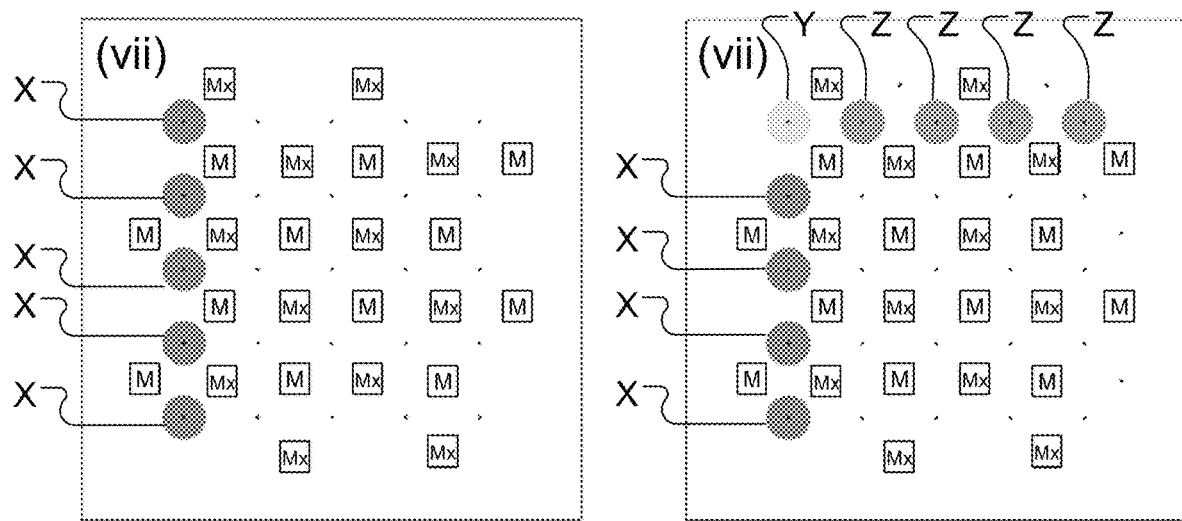

FIG. 2B also includes a second diagram 212 that shows a fourth layer of operations applied to the surface code patch. The fourth layer of operations includes an arbitrary-angle rotation operation 214 is applied to one of the data qubits. This arbitrary-angle rotation operation 214 is used to perform the magic state injection, and so varies depending on which state is being injected. For example, as shown in FIG. 3B, the rotation operation could be an identity operation or an S gate if a plus state or i state are being injected.

FIG. 2C includes a first diagram 220 that shows a fifth layer of operations applied to the surface code patch. The fifth layer of operations includes a third set of entangling operations, e.g., CNOT gates. Each CNOT gate uses a respective measure qubit as a control and targets another different neighboring data qubit (i.e., a neighboring qubit that is different to the neighboring qubits targeted in the second and third layer of operations). As described above with reference to the second set of entangling operations, CNOT gates on the diagonal that crosses the injection site also follow the same order/direction as the CNOT gate at the injection site to optimize the circuit.

FIG. 2C also includes a second diagram 222 that shows a sixth layer of operations applied to the surface code patch. The sixth layer of operations includes a fourth set of entangling operations, e.g., CNOT gates. Each CNOT gate uses a respective measure qubit as a control and targets another different neighboring data qubit (i.e., a neighboring qubit that is different to the neighboring qubits targeted in the second, third, and fifth layer of operations).

Figure 2D:
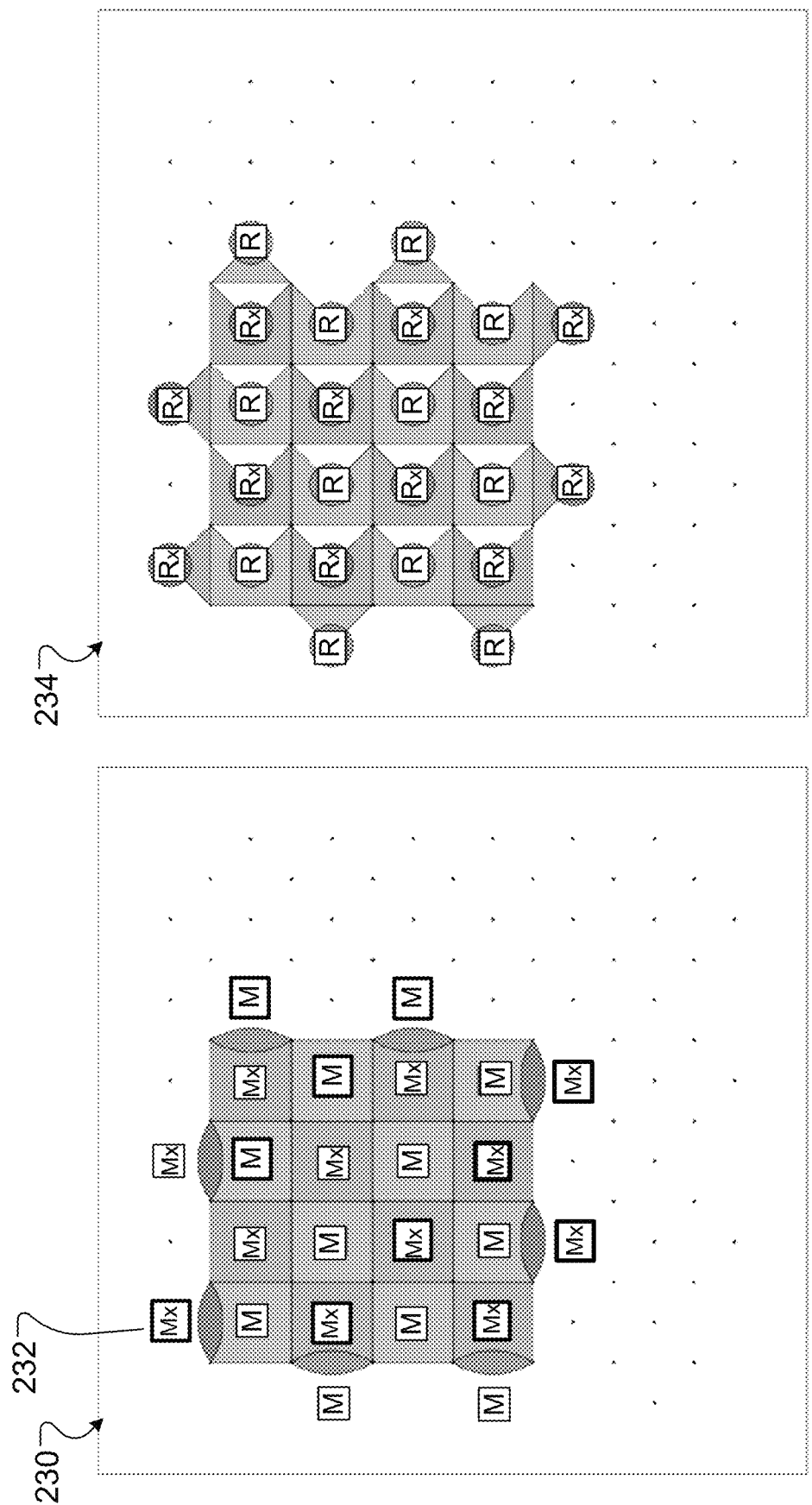

FIG. 2D includes a first diagram 230 that shows a seventh layer of operations applied to the surface code patch. The seventh layer of operations includes a set of measurement operations that are applied to respective measurement qubits. The heavy outlined measurement operations, e.g., measurement operation 232, produces outcomes that are predictable from previous measurements. These outcomes can be processed by the quantum computing device and used to detect errors, e.g., by comparing the obtained measurement outcomes to stored predicted outcomes. If an error is detected, i.e., if any of the measurement outcomes are incorrect and do not match the predicted measurement outcomes, the hook injection process fails and restarts, i.e., the first-seventh layers of operations are re-applied. If no errors are detected, the below described eighth layer of operations is applied to the surface code patch. The first-seventh layers of operations form a first round of stabilizer measurements in the hook injection process.

FIG. 2D includes a second diagram 234 that shows an eighth layer of operations applied to the surface code patch. The eighth layer of operations include a set of reset operations that initialize respective measure qubits in the surface code patch, e.g., initialize the measure qubits in zero states.

Figure 2E:
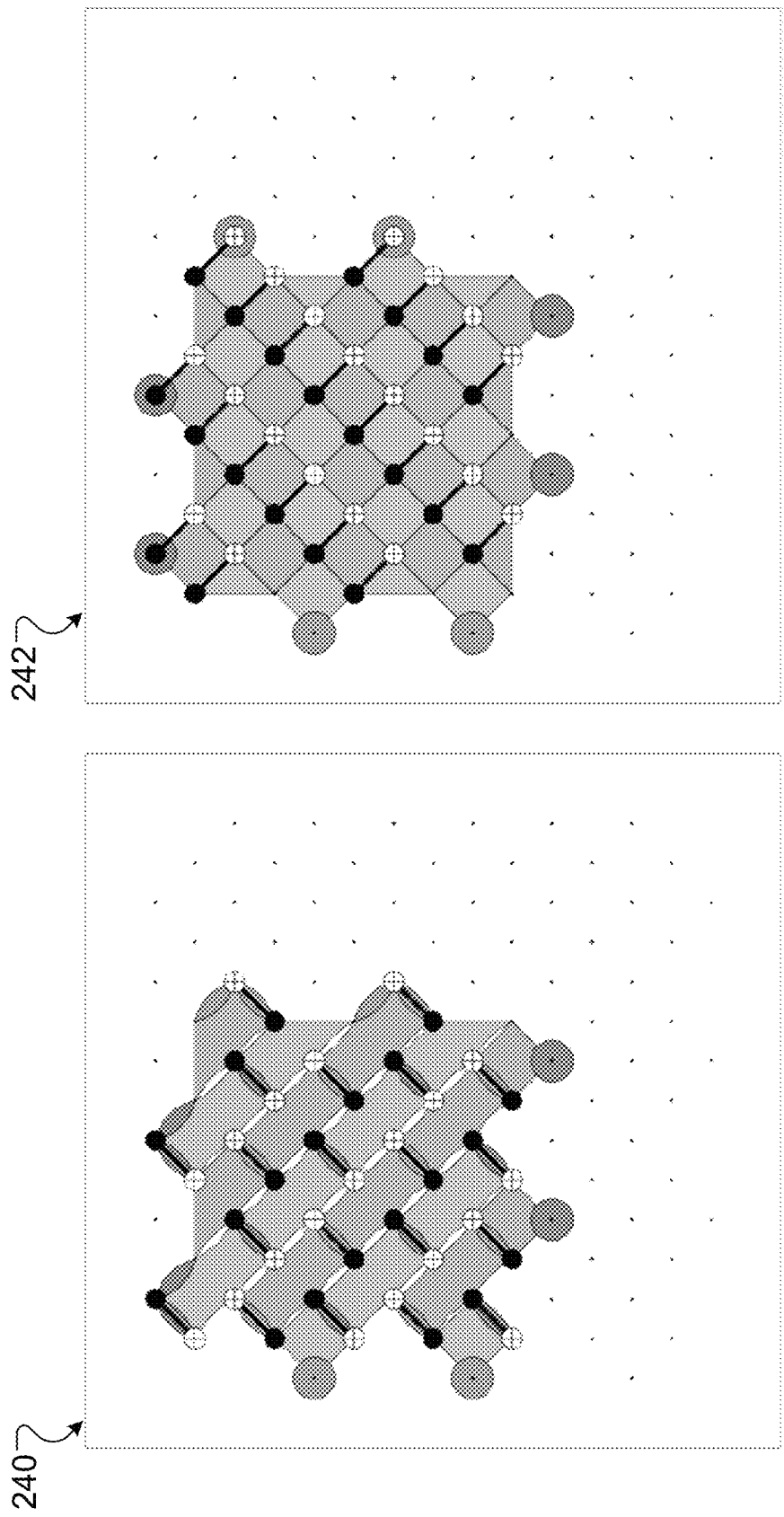

FIG. 2E includes a first diagram 240 that shows a ninth layer of operations applied to the surface code patch. The ninth layer of operations includes a set of entangling operations, e.g., CNOT gates. Each CNOT gate uses a respective measure qubit as a control and targets a neighboring data qubit. FIG. 2E also includes a second diagram 242 that shows a tenth layer of operations applied to the surface code patch. The tenth layer of operations includes a set of entangling operations, e.g., CNOT gates. Each CNOT gate uses a respective measure qubit as a control and targets a different neighboring data qubit (different to the neighboring qubit targeted in the ninth layer).

FIG. 2F includes a first diagram 250 that shows an eleventh layer of operations applied to the surface code patch. The eleventh layer of operations includes a set of entangling operations, e.g., CNOT gates. Each CNOT gate uses a respective measure qubit as a control and targets a different neighboring data qubit (different to the neighboring qubit targeted in the ninth and tenth layers). FIG. 2F also includes a second diagram 252 that shows a twelfth layer of operations applied to the surface code patch. The twelfth layer of operations includes a set of entangling operations, e.g., CNOT gates. Each CNOT gate uses a respective measure qubit as a control and targets a different neighboring data qubit (different to the neighboring qubit targeted in the ninth, tenth, and eleventh layer).

Figure 2G:
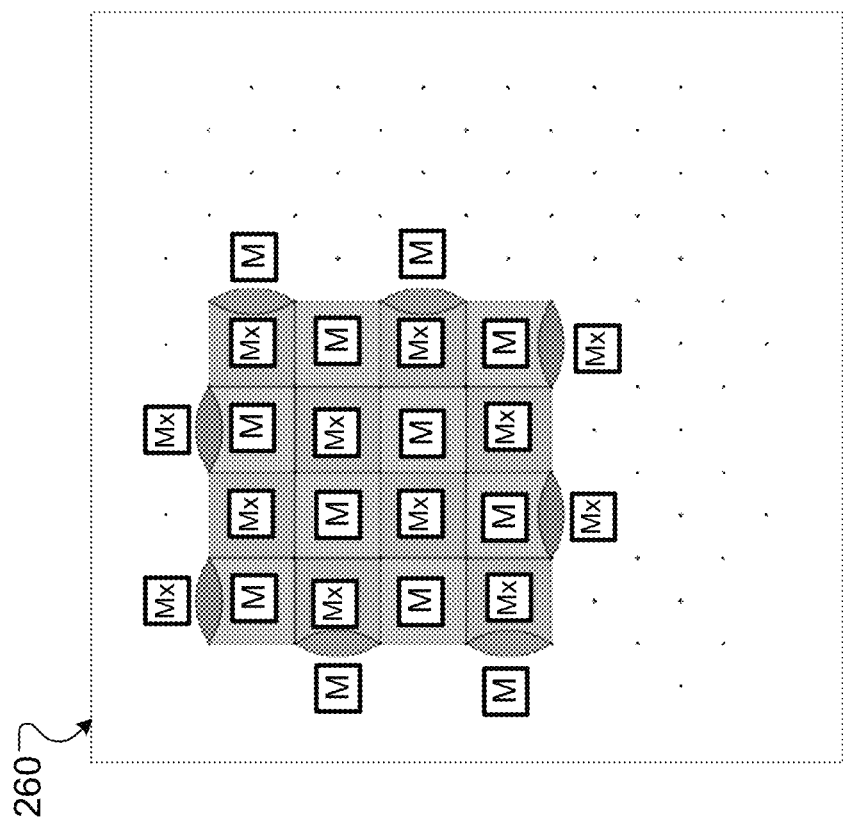

FIG. 2G includes a diagram 260 that shows a thirteenth layer of operations applied to the surface code patch. The thirteenth layer of operations includes a set of measurement operations that are applied to respective measure qubits in the surface code patch. Each measurement operation produces outcomes that are predictable from previous measurements. These outcomes can be processed by the quantum computing device and used to detect errors, e.g., by comparing the obtained measurement outcomes to stored predicted outcomes. If an error is detected, i.e., if any of the measurement outcomes are incorrect and do not match the predicted measurement outcomes, the hook injection process fails and restarts, i.e., the first-seventh layers of operations are re-applied. If no errors are detected, the surface code patch is grown and the below described fourteenth layer of operations is applied to the surface code patch. The eighth-thirteenth layers of operations form a second round of stabilizer measurements in the hook injection process. The sets of entangling operations included in this second round of stabilizer measurements can follow a standard surface code cycle, i.e., cause each measure qubit to interact with each of its neighboring data qubits without purposefully incurring a hook error. That is, the example order of layers of entangling operations shown in FIGS. 2E and 2F is a non-limiting example and can vary.

FIG. 2H includes a first diagram 272 that shows a fourteenth layer of operations applied to the surface code patch, where the size of the surface code patch has increased to the target distance. The fourteenth layer of operations include a set of reset operations that initialize respective measure qubits in the surface code patch, e.g., initialize the measure qubits in zero states.

FIG. 2H includes a second diagram 274 that shows a fifteenth layer of operations applied to the surface code patch. The fifteenth layer of operations includes a set of entangling operations that are applied to the larger surface code patch, e.g., CNOT gates. Each CNOT gate uses a respective measure qubit as a control and targets a neighboring data qubit.

FIG. 2I includes a first diagram 282 that shows a sixteenth layer of operations applied to the larger surface code patch. The sixteenth layer of operations includes a set of entangling operations, e.g., CNOT gates. Each CNOT gate uses a respective measure qubit as a control and targets a different neighboring data qubit (different to the neighboring data qubit targeted in the fifteenth layer). FIG. 2I includes a second diagram 284 that shows a seventeenth layer of operations applied to the larger surface code patch. The seventeenth layer of operations includes a set of entangling operations, e.g., CNOT gates. Each CNOT gate uses a respective measure qubit as a control and targets a neighboring data qubit.

Figure 2J:
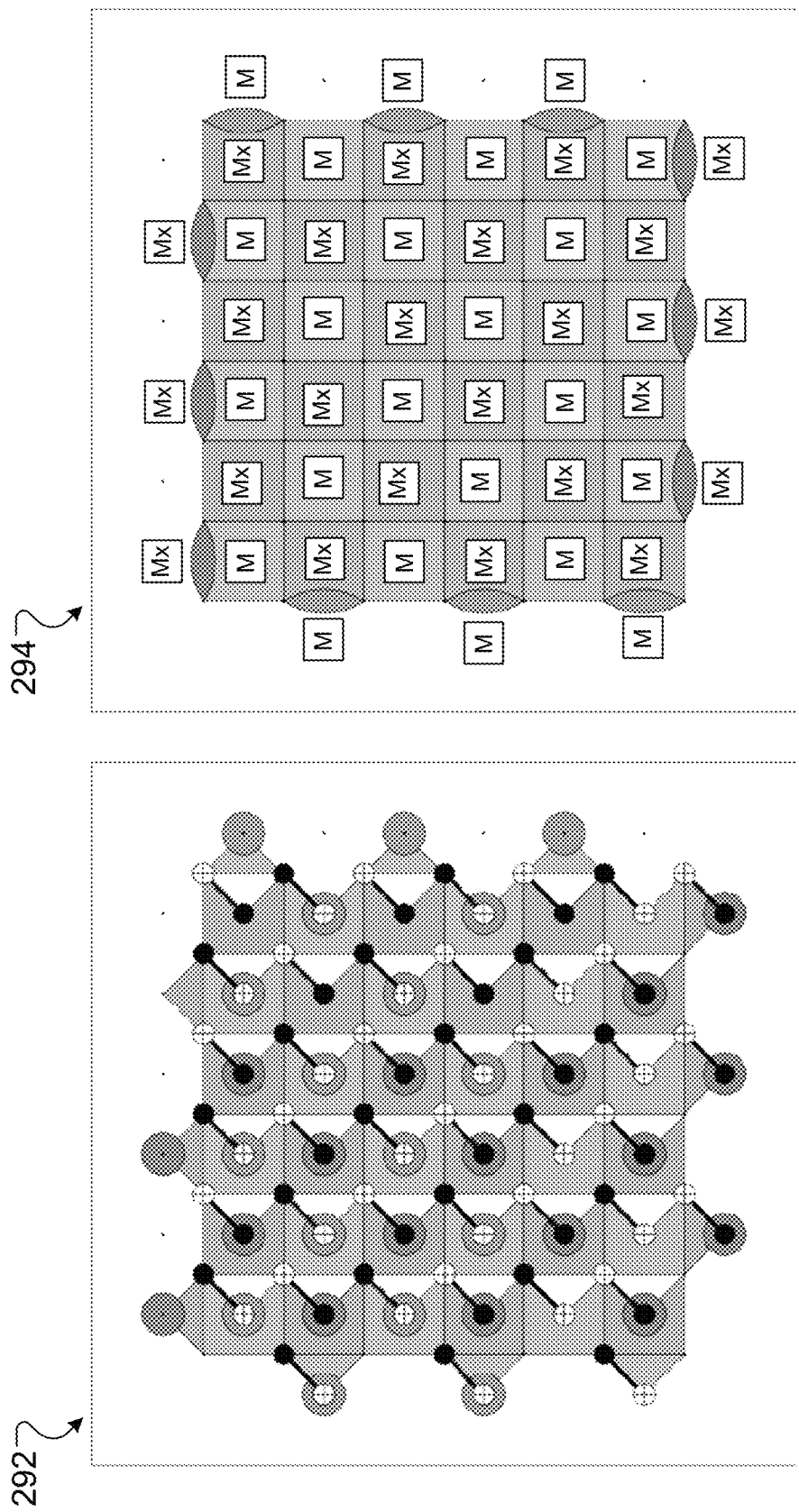

FIG. 2J includes a first diagram 292 that shows an eighteenth layer of operations applied to the larger surface code patch. The eighteenth layer of operations includes a set of entangling operations, e.g., CNOT gates. Each CNOT gate uses a respective measure qubit as a control and targets a different neighboring data qubit (different to the neighboring data qubit targeted in the fifteenth and sixteenth layer). FIG. 2J also includes a second diagram 294 that shows a nineteenth layer of operations applied to the larger surface code patch. The nineteenth layer of operations includes a set of measurement operations that are applied to respective measure qubits in the surface code patch. The results of the measurement operations can be provided to a decoder for decoding and error correction.

The fourteenth—nineteenth layers of operations form another round of stabilizer measurements in the hook injection process. The sets of entangling operations included in this round of stabilizer measurements can follow a standard surface code cycle, i.e., cause each measure qubit to interact with each of its neighboring data qubits without purposefully incurring a hook error. That is, the example order of layers of entangling operations shown in FIGS. 2H-J is a non-limiting example and can vary.

In some implementations the fourteenth—nineteenth layers of operations can be repeated a predetermined number of times and the magic state encoded into the surface code patch can be provided as input for a magic state distillation process.

FIGS. 3A-D show observable slice diagrams that correspond to the first round of stabilizer measurements in the example hook injection quantum circuit shown in FIGS. 2A-I. As described above with reference to FIG. 2B, in the first round of stabilizer measurement a magic state is injected at a data qubit of the surface code patch. In each of FIGS. 3A-D, the left column shows operations (i)-(vii) performed to inject a |+⟩ state using hook injection with $d_{inject}=5$, $r_{inject}=2$, d=5 and the right column shows operations (i)-(vii) performed to inject an |i⟩ state using hook injection with $d_{inject}=5$, $r_{inject}=2$, d=5. The arbitrary-angle rotation described above with reference to FIG. 2B is an identity operator in observable slice diagram (iv) for the injection of the |+⟩ state and is an S gate in observable slice diagram (iv) for the injection of the |i⟩ state.

In each observable slice diagram, filled circles labeled "X" show the Pauli-X terms of the observable as the quantum circuit progresses. Similarly, filled circles labeled "Y" show the Pauli-Y terms of the observable as the quantum circuit progresses and filled circles labeled "Z" show the Pauli-Z terms of the observable as the quantum circuit progresses. Terms are introduced by reset operations, are transformed by Clifford operations, and then determine the observable whose eigenstate is the injected state. Filled in circles are the observable after the operations in a step have executed, while outlined circles are from before the operation.

Figure 4:
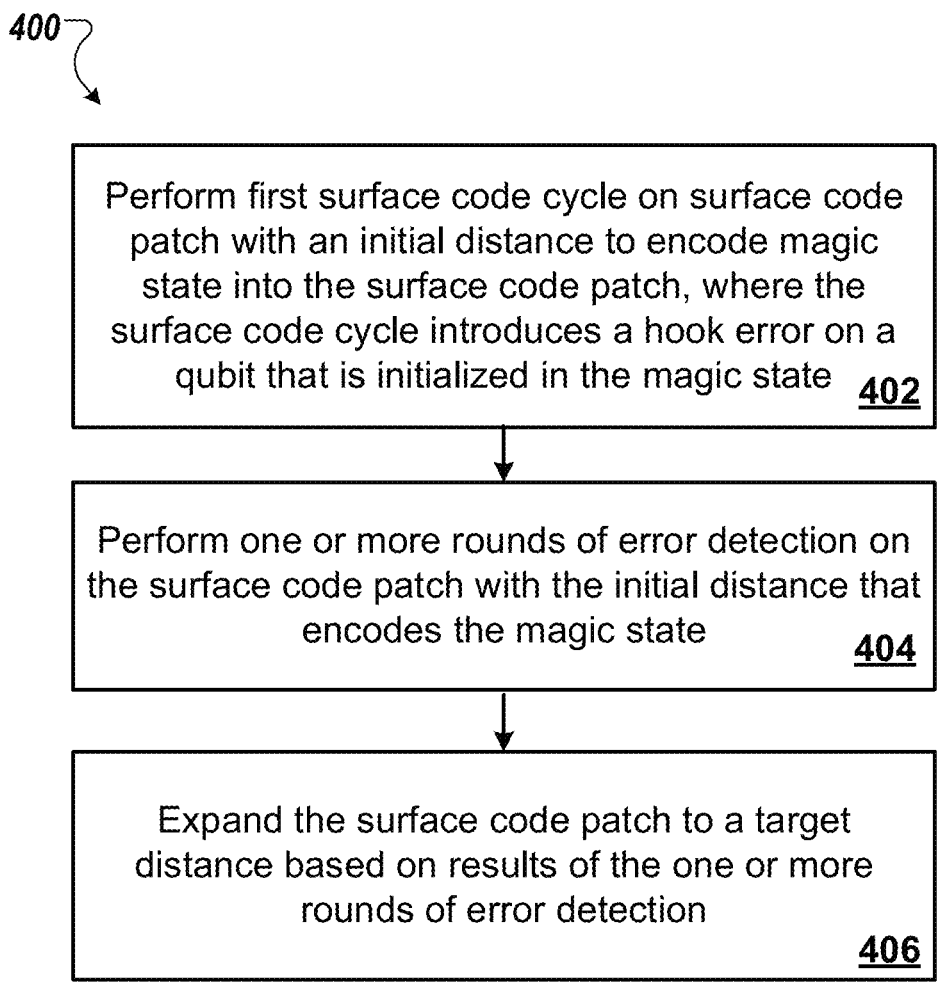
FIG. 4 is a flowchart of an example process for encoding a magic state in a surface code patch of physical qubits with a target distance.

FIG. 4 is a flowchart of an example process 400 for encoding a magic state in a surface code patch of physical qubits with a target distance. The magic state is a quantum state on the X-Y or Y-Z plane of the Bloch sphere, e.g., a "i⟩ state, a |+⟩ state, a T-type magic state, or a H-type magic state. For convenience, the process 400 will be described as being performed by components of a quantum computing system. For example, a quantum computer, e.g., the system 100 of FIG. 1 or the quantum computer 600 of FIG. 6, appropriately programmed, can perform example process 400.

The system performs a first surface code cycle on a surface code patch of physical qubits with an initial distance to encode the magic state into the surface code patch of physical qubits (step 402). Performing the first surface code cycle introduces a hook error associated with a four-body stabilizer on a qubit included in the surface code patch, where the hook error rotates a logical observable of the surface code patch. A hook error is an error on a measure qubit that occurs halfway through a surface code cycle and causes a set of detection events equivalent to two data qubit errors at completion of the surface code cycle. During the first surface code cycle, the system initializes the qubit with the hook error in the magic state.

To perform the first surface code cycle on the surface code patch of physical qubits, the system measures stabilizers of the surface code patch of physical qubits, e.g., through application of a quantum circuit to the surface code patch of physical qubits. The quantum circuit can include a layer of initialization operations that cause initialization bases of data qubits in the surface code patch of physical qubit to switch from X to Z across a diagonal of the surface code patch that crosses a site at which the qubit is initialized in the magic state. The quantum circuit also includes a first layer of CNOT gates, where each CNOT gate uses a respective measure qubit as a control and targets a first data qubit that neighbors the measure qubit. The quantum circuit can be optimized to exclude no-operation entangling gates in the first layer of CNOT gates, the no-operation entangling gates comprising entangling gates with a control qubit in a zero state or entangling gates with a target qubit in a plus state.

The quantum circuit also includes a second layer of CNOT gates, where each CNOT gate uses a respective measure qubit as a control and targets a second data qubit that neighbors the measure qubit. The qubit (that has the hook error) can be initialized in the magic state after the second layer of CNOT gates, e.g., through application of an appropriate single qubit rotation operation (where the specific rotation depends on the type of magic state being encoded into the patch).

The quantum circuit further includes a third layer of CNOT gates, where each CNOT gate uses a respective measure qubit as a control and targets a third data qubit that neighbors the measure qubit, a fourth layer of CNOT gates, where each CNOT gate uses a respective measure qubit as a control and targets a fourth data qubit that neighbors the measure qubit, where the first, second, third, and fourth data qubits are different data qubits, and a layer of measurement operations that are applied to respective measure qubits.

The system performs one or more rounds of error detection on the surface code patch of physical qubits that encodes the magic state (step 404). The rounds of error detection verify the initial injection of the magic state. The system processes outcomes of stabilizer measurements made during the first surface code cycle to detect errors in the surface code patch of physical qubits that encodes the magic state. In response to detecting one or more errors, the system discards the magic state and can repeat steps 402 and 404. In response to detecting no errors, the system performs a subsequent round of error detection on the surface code patch of physical qubits, i.e., performs a second surface code cycle and determines again whether any errors occurred.

The system expands the surface code patch of physical qubits to the target distance based on results of the one or more rounds of error detection (step 406). For example, the system can expand the surface code patch when one or more rounds of error detection have indicated that no errors have occurred. Expanding the surface code patch can include initializing a number of physical qubits that neighbor the surface code patch and performing a round of error detection (a surface code cycle) on the expanded patch to complete the encoding of the magic state in the surface code patch with the target distance. Regardless of whether error syndromes are found in this surface code cycle, the encoded magic state can be used for further error correction or magic state distillation.

In some implementations the initial distance, number of one or more rounds of error detection, and the target distance can be selected in advance based on a target success before-deadline probability for injection of the magic state. For example, in some physical implementations it may be beneficial to construct an injection process that fits into larger magic state factories, where the injection has to pack into a limited amount of spacetime. In this context, the injection taking too long to succeed causes the factory to fail. Adding more detail to the example, suppose the injection site is a distance 15 patch, available for 15 rounds, and the chance of the injection succeeding, before that deadline is reached, needs to be at least 99%. Running a distance 15 patch for 15 rounds costs around 7000 qubit rounds. The half life of a repeat-until-success process is roughly 70% of its expected duration. It takes 7 half lives to reach a 99% chance of completion. Thus, injection configurations with an expected cost between 500 qubit rounds and 2000 qubit rounds are relevant. A suitable choice for this particular budget would be hook injection with $d_{inject}=7$, $r_{inject}=2$ (injection error rate 0.06%, expected cost 700 qubit rounds) or $d_{inject}=6$, $r_{inject}=3$ (injection error rate 0.04%, expected cost 950 qubit rounds). Alternatively, a much higher success before-deadline probability for the injection is required, the parameters could be selected as $d_{inject}=5$, $r_{inject}=2$ (injection error rate 0.09%, expected cost 200 qubit rounds).

Figure 5:
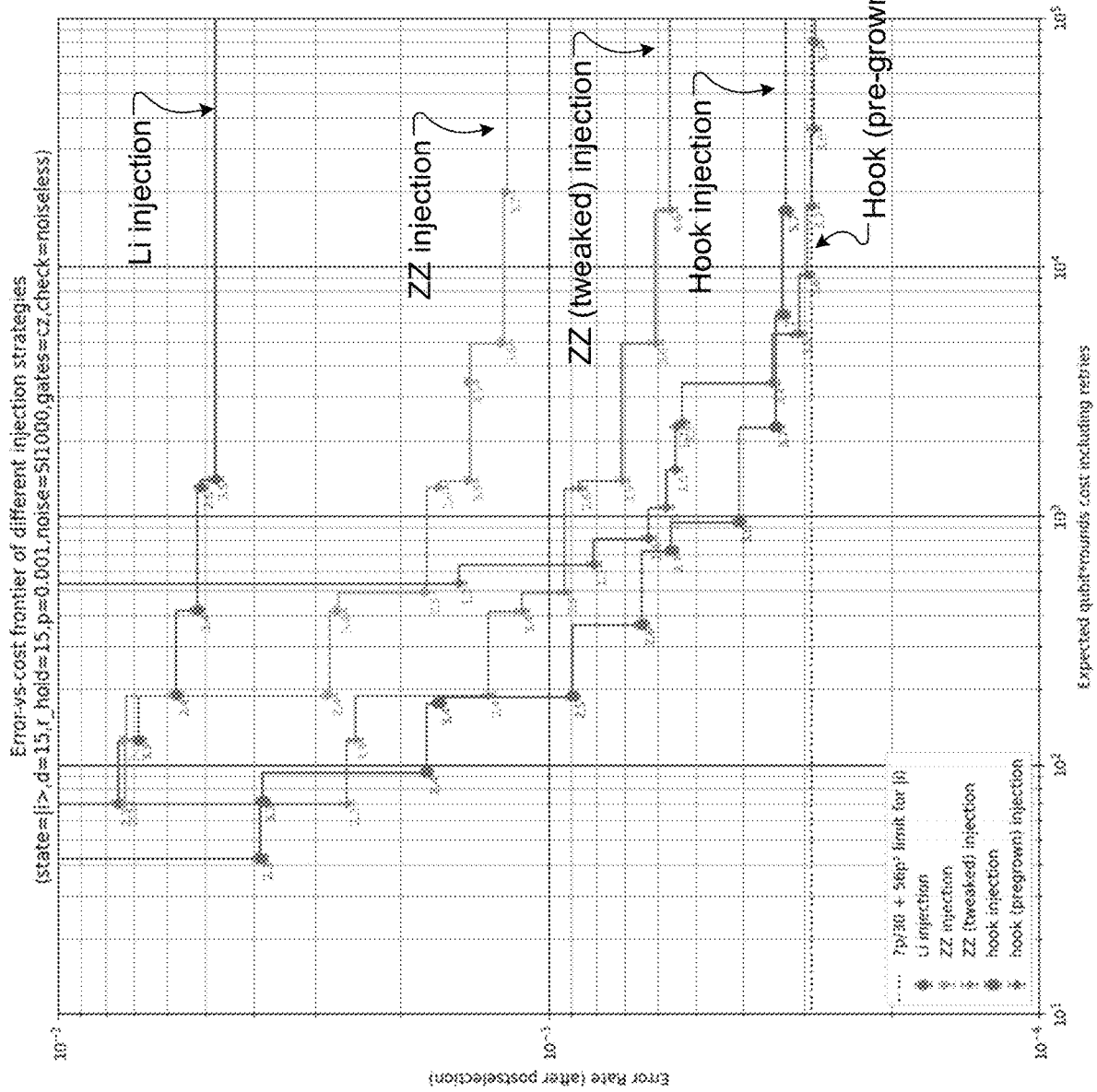
FIG. 5 is a plot that compares the Pareto frontiers of previous magic state injection quantum circuits to the presently described hook injection quantum circuit.

FIG. 5 is a plot that compares the Pareto frontiers of previous magic state injection circuits (labelled "Li", "ZZ", and "ZZ tweaked") to the presently described hook injection circuit (labelled "hook" and "hook (pre-grown)". All variants were sampled until a billion samples had been taken, or 1000 un-discarded logical errors had occurred, whichever came first. For each variant, the sampled discard rate, the injection patch size ($d_{inject}$), and the number of check rounds ($r_{inject}$), were combined into an estimate of the expected spacetime volume cost per successful injection. The Pareto frontiers clearly show that the presently described hook injection technique outperforms previous constructions. Hook injection reaches lower injection error rates than the previous constructions, and it achieves specific error rates with lower cost than the previous constructions.

Figure 6:
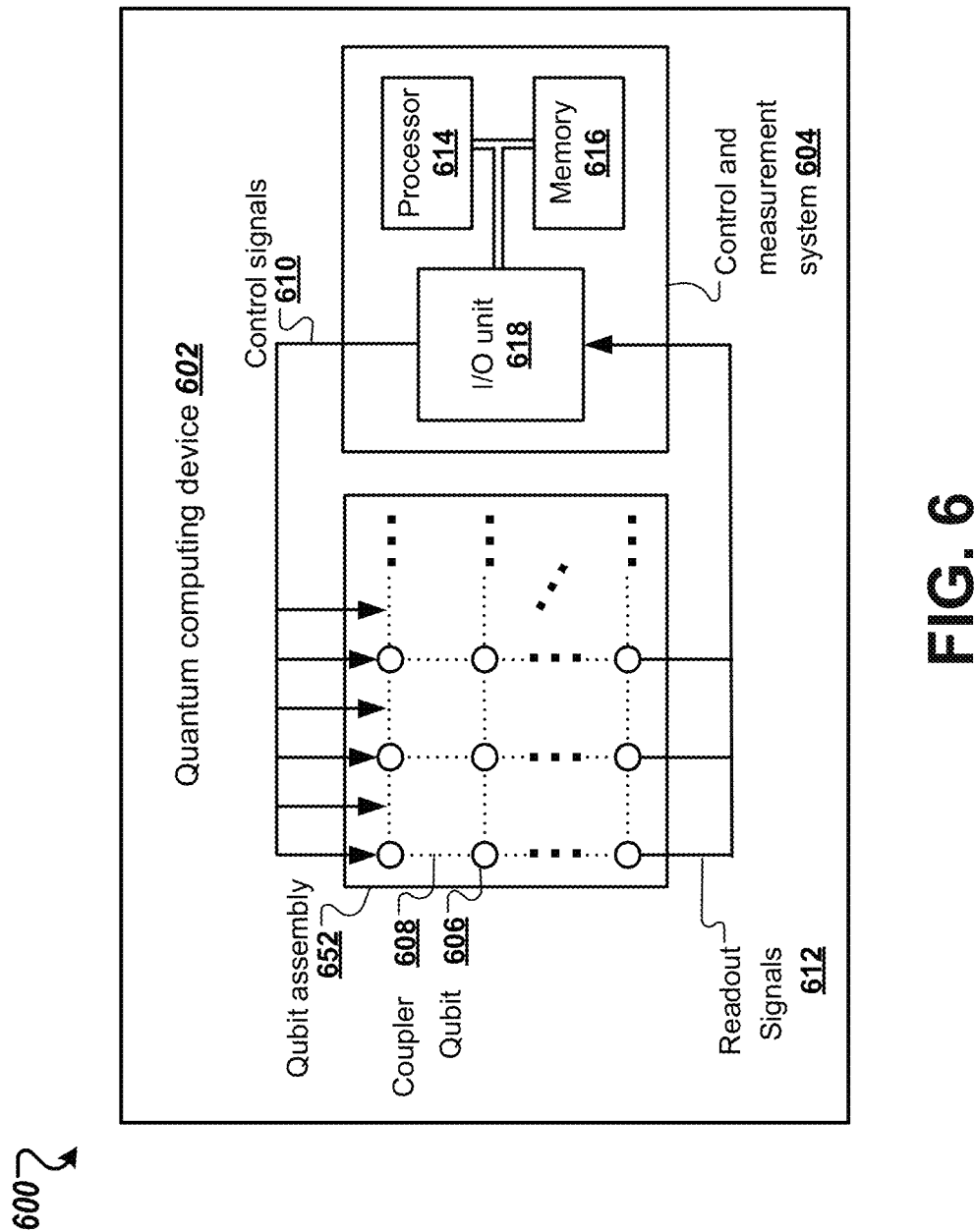
FIG. 6 depicts an example quantum computer.

FIG. 6 depicts an example quantum computer 600 for performing the quantum operations described in this specification. The example quantum computer 600 includes an example quantum computing device 602. The quantum computing device 602 is intended to represent various forms of quantum computing devices. The components shown here, their connections and relationships, and their functions, are exemplary only, and do not limit implementations of the inventions described and/or claimed in this document.

The example quantum computing device 602 includes a qubit assembly 652 and a control and measurement system 604. The qubit assembly includes multiple physical qubits, e.g., qubit 606, that are used to perform algorithmic operations or quantum computations. While the qubits shown in FIG. 6 are arranged in a rectangular array, this is a schematic depiction and is not intended to be limiting. The qubit assembly 652 also includes adjustable coupling elements, e.g., coupler 608, that allow for interactions between coupled qubits. In the schematic depiction of FIG. 6, each qubit is adjustably coupled to each of its four adjacent qubits by means of respective coupling elements. However, this is an example arrangement of qubits and couplers, and other arrangements are possible, including arrangements that are non-rectangular, e.g., hexagonal, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device 602 included in the example computer 600 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semiconducting qubits, e.g., superconducting transmon states. As another example, in a NMR quantum computer the qubits may be realized via nuclear spin states.

In some implementations a quantum computation can proceed by loading qubits, e.g., from a quantum memory, and applying a sequence of unitary operators to the qubits. Applying a unitary operator to the qubits can include applying a corresponding sequence of quantum logic gates to the qubits, e.g., to implement the surface code circuits described in this specification. Example quantum logic gates include single-qubit gates, e.g., Pauli-X, Pauli-Y, Pauli-Z (also referred to as X, Y, Z), Hadamard gates, S gates, rotations, two-qubit gates, e.g., controlled-X, controlled-Y, controlled-Z (also referred to as CX, CY, CZ), controlled NOT gates (also referred to as CNOT), iSWAP gates, and gates involving three or more qubits, e.g., Toffoli gates. The quantum logic gates can be implemented by applying control signals 610 generated by the control and measurement system 604 to the qubits and to the couplers.

For example, in some implementations the qubits in the qubit assembly 652 can be frequency tunable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 610 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X, Y, or Z, using respective control signals 610. The measurements cause readout signals 612 representing measurement results to be communicated back to the measurement and control system 604. The readout signals 612 may include RF, microwave, or optical signals depending on the physical scheme for the quantum computing device and/or the qubits. For convenience, the control signals 610 and readout signals 612 shown in FIG. 6 are depicted as addressing only selected elements of the qubit assembly (i.e., the top and bottom rows), but during operation the control signals 610 and readout signals 612 can address each element in the qubit assembly 652.

The control and measurement system 604 is an example of a classical computer system that can be used to perform various operations on the qubit assembly 652, as described above, as well as other classical subroutines or computations. The control and measurement system 604 includes one or more classical processors, e.g., classical processor 614, one or more memories, e.g., memory 616, and one or more I/O units, e.g., I/O unit 618, connected by one or more data buses. The control and measurement system 604 can be programmed to send sequences of control signals 610 to the qubit assembly, e.g., to carry out a selected series of quantum gate operations, and to receive sequences of readout signals 612 from the qubit assembly, e.g., as part of performing measurement operations and post processing measurement results.

The processor 614 is configured to process instructions for execution within the control and measurement system 604. In some implementations, the processor 614 is a single-threaded processor. In other implementations, the processor 614 is a multi-threaded processor. The processor 614 is capable of processing instructions stored in the memory 616.

The memory 616 stores information within the control and measurement system 604. In some implementations, the memory 616 includes a computer-readable medium, a volatile memory unit, and/or a non-volatile memory unit. In some cases, the memory 616 can include storage devices capable of providing mass storage for the system 604, e.g., a hard disk device, an optical disk device, a storage device that is shared over a network by multiple computing devices (e.g., a cloud storage device), and/or some other large capacity storage device.

The input/output device 618 provides input/output operations for the control and measurement system 604. The input/output device 618 can include D/A converters, A/D converters, and RF/microwave/optical signal generators, transmitters, and receivers, whereby to send control signals 610 to and receive readout signals 612 from the qubit assembly, as appropriate for the physical scheme for the quantum computer. In some implementations, the input/output device 618 can also include one or more network interface devices, e.g., an Ethernet card, a serial communication device, e.g., an RS-232 port, and/or a wireless interface device, e.g., an 802.8 card. In some implementations, the input/output device 618 can include driver devices configured to receive input data and send output data to other external devices, e.g., keyboard, printer and display devices.

Although an example control and measurement system 604 has been depicted in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively, or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by a quantum computer for encoding a magic state in a surface code patch of physical qubits with a target distance, the method comprising:
performing a first surface code cycle on a surface code patch of physical qubits with an initial distance to encode the magic state into the surface code patch of physical qubits, wherein
performing the first surface code cycle introduces a hook error associated with a four-body stabilizer on a qubit included in the surface code patch, wherein the hook error rotates a logical observable of the surface code patch, and
performing the first surface code cycle comprises initializing the qubit in the magic state;
performing one or more rounds of error detection on the surface code patch of physical qubits that encodes the magic state; and
expanding the surface code patch of physical qubits to the target distance based on results of the one or more rounds of error detection.

2. The method of claim 1, wherein
performing the first surface code cycle on the surface code patch of physical qubits comprises measuring stabilizers of the surface code patch of physical qubits;
performing the one or more rounds of error detection on the surface code patch of physical qubits that encodes the magic state comprises processing outcomes of the stabilizer measurements to detect errors in the surface code patch of physical qubits that encodes the magic state; and
in response to detecting one or more errors, discarding the magic state that is encoded in the surface code patch of physical qubits; or
in response to detecting no errors, performing a subsequent round of error detection on the surface code patch of physical qubits.

3. The method of claim 2, wherein measuring stabilizers of the surface code patch of physical qubits comprises applying a quantum circuit to the surface code patch of physical qubits, wherein the quantum circuit comprises:
a first layer of CNOT gates, wherein each CNOT gate uses a respective measure qubit as a control and targets a first data qubit that neighbors the measure qubit;
a second layer of CNOT gates, wherein each CNOT gate uses a respective measure qubit as a control and targets a second data qubit that neighbors the measure qubit;
a third layer of CNOT gates, wherein each CNOT gate uses a respective measure qubit as a control and targets a third data qubit that neighbors the measure qubit;
a fourth layer of CNOT gates, wherein each CNOT gate uses a respective measure qubit as a control and targets a fourth data qubit that neighbors the measure qubit, wherein the first, second, third, and fourth data qubits are different data qubits; and
a layer of measurement operations that are applied to respective measure qubits.

4. The method of claim 3, wherein performing the first surface code cycle comprises initializing the qubit in the magic state after application of the second layer of CNOT gates.

5. The method of claim 3, wherein the quantum circuit is optimized to exclude no-operation entangling gates in the first layer of CNOT gates, the no-operation entangling gates comprising entangling gates with a control qubit in a zero state or entangling gates with a target qubit in a plus state.

6. The method of claim 3, wherein the quantum circuit further comprises a layer of initialization operations prior to the first layer of CNOT gates, wherein the initialization operations cause initialization bases of data qubits in the surface code patch of physical qubit to switch from X to Z across a diagonal of the surface code patch that crosses a site at which the qubit is initialized in the magic state.

7. The method of claim 2, wherein performing the subsequent round of error detection on the surface code patch of physical qubits comprises:
performing a second surface code cycle on the surface code patch of physical qubits with the initial distance to measure the stabilizers of the surface code patch of physical qubits; and
processing outcomes of stabilizer measurements to detect errors in the surface code patch of physical qubits that encodes the magic state; and
in response to detecting one or more errors, discarding the magic state that is encoded in the surface code patch of physical qubits; or
in response to detecting no errors, expanding the surface code patch of physical qubits with the initial distance to the target distance.

8. The method of claim 1, wherein a hook error comprises an error on a measure qubit that occurs halfway through a surface code cycle and causes a set of detection events equivalent to two data qubit errors at completion of the surface code cycle.

9. The method of claim 1, wherein initializing the qubit in the magic state applying a single qubit rotation operation.

10. The method of claim 1, wherein the magic state comprises a quantum state on the X-Y or Y-Z plane of a Bloch sphere.

11. The method of claim 10, wherein the magic state comprises an $|i\rangle$ state, a $|+\rangle$ state, a T-type magic state, or a H-type magic state.

12. The method of claim 1, further comprising selecting the initial distance, number of one or more rounds of error detection, and the target distance based on a target success before-deadline probability for injection of the magic state.

13. The method of claim 1, wherein the initial distance is equal to 2 or 5, a number of the one or more rounds of error detection is equal to 2, and the target distance is equal to 7.

14. The method of claim 1, wherein the surface code cycle comprises a rotated surface code cycle.

15. A quantum computing apparatus comprising:
quantum computing hardware comprising:
a plurality of physical qubits arranged on a grid;
qubit couplers defining interactions between the plurality of qubits; and
control electronics configured to operate the plurality of qubits and qubit couplers; and
a classical processor configured to receive and process data received from the quantum computing hardware;
wherein the quantum computing apparatus is configured to perform operations for encoding a magic state in a surface code patch of physical qubits with a target distance, the operations comprising:
performing a first surface code cycle on a surface code patch of physical qubits with an initial distance to encode the magic state into the surface code patch of physical qubits, wherein
performing the first surface code cycle introduces a hook error associated with a four-body stabilizer on a qubit included in the surface code patch, wherein the hook error rotates a logical observable of the surface code patch, and
performing the first surface code cycle comprises initializing the qubit in the magic state;
performing one or more rounds of error detection on the surface code patch of physical qubits that encodes the magic state; and
expanding the surface code patch of physical qubits to the target distance based on results of the one or more rounds of error detection.

16. The apparatus of claim 15, wherein the magic state comprises a quantum state on the X-Y or Y-Z plane of a Bloch sphere.

17. The apparatus of claim 15, wherein initializing the qubit in the magic state applying a single qubit rotation operation.

18. The apparatus of claim 17, wherein the magic state comprises an $|i\rangle$ state, a $|+\rangle$ state, a T-type magic state, or a H-type magic state.

19. The apparatus of claim 15, wherein the first surface code cycle comprises a rotated surface code cycle.

20. The apparatus of claim 15, wherein the hook error comprises an error on a measure qubit that occurs halfway through a surface code cycle and causes a set of detection events equivalent to two data qubit errors at completion of the surface code cycle.

* * * * *